US010989593B2

(12) United States Patent
Iida et al.

(10) Patent No.: US 10,989,593 B2
(45) Date of Patent: Apr. 27, 2021

(54) MULTI-ANGLE COLORIMETER THAT SUPPRESSES THE INFLUENCE OF AN INCLINATION OF A REFERENCE ANGLE ON A COLORIMETRIC RESULT

(71) Applicant: KONICA MINOLTA, INC., Chiyoda-ku (JP)

(72) Inventors: Shinichi Iida, Sakai (JP); Yoshitaka Teraoka, Suita (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/738,265

(22) PCT Filed: Jun. 14, 2016

(86) PCT No.: PCT/JP2016/067660
§ 371 (c)(1),
(2) Date: Dec. 20, 2017

(87) PCT Pub. No.: WO2016/208456
PCT Pub. Date: Dec. 29, 2016

(65) Prior Publication Data
US 2018/0180480 A1 Jun. 28, 2018

(30) Foreign Application Priority Data
Jun. 26, 2015 (JP) .............................. JP2015-128544

(51) Int. Cl.
*G01J 3/10* (2006.01)
*G01J 3/50* (2006.01)
*G01J 3/36* (2006.01)

(52) U.S. Cl.
CPC . *G01J 3/10* (2013.01); *G01J 3/36* (2013.01); *G01J 3/50* (2013.01); *G01J 2003/102* (2013.01)

(58) Field of Classification Search
CPC ........ G01J 3/10; G01J 3/36; G01J 3/50; G01J 2003/102
See application file for complete search history.

(56) References Cited

U.S. PATENT DOCUMENTS 6,424,413 B1 * 7/2002 Weber .................. G01J 3/0251
250/228
6,707,553 B1 * 3/2004 Imura ...................... G01J 3/10
356/402

(Continued)

FOREIGN PATENT DOCUMENTS

JP  4-072551   3/1992
JP  7-294334   11/1995

(Continued)

OTHER PUBLICATIONS

Office Action dated Apr. 23, 2020 issued in Japanese Patent Application No. 2017-525237.

(Continued)

*Primary Examiner* — Hwa Andrew Lee
(74) *Attorney, Agent, or Firm* — Cozen O'Connor

(57) ABSTRACT

First and second measurement operations are performed according to each of a plurality of geometric conditions while keeping the geometric condition. In the first measurement operation, illumination light is radiated from a first light radiating position toward a measurement target position and spectroscopic measurement is performed on reflected light traveling from the measurement target position toward a first light receiving position. In the second measurement operation, illumination light is radiated from a second light radiating position toward a measurement target position and spectroscopic measurement is performed on reflected light traveling from the measurement target position toward a second light receiving position. The two spectroscopic measurement results are averaged. The second (Continued)

light radiating position and the second light receiving position are respectively disposed symmetrical to the first light radiating position and the first light receiving position with respect to a reference axis.

4 Claims, 13 Drawing Sheets

(56) References Cited

U.S. PATENT DOCUMENTS

| | | | |
|---|---|---|---|
| 7,221,444 B1 * | 5/2007 | Zhao | G01N 21/8806 356/237.1 |
| 2005/0286053 A1 | 12/2005 | Imura | |
| 2014/0055787 A1 * | 2/2014 | Teraoka | G01J 3/504 356/402 |
| 2015/0192469 A1 * | 7/2015 | Teraoka | G01J 3/504 356/402 |

FOREIGN PATENT DOCUMENTS

| | | |
|---|---|---|
| JP | 2004-163314 | 6/2004 |
| JP | 2006-010508 | 1/2006 |
| JP | 2010-237097 | 10/2010 |
| JP | 2011-137789 | 7/2011 |
| WO | WO 2012/147488 | 11/2012 |

OTHER PUBLICATIONS

Office Action dated Oct. 19, 2020 issued in Japanese Patent Application No. 2017-525237.

* cited by examiner

MULTI-ANGLE COLORIMETER THAT SUPPRESSES THE INFLUENCE OF AN INCLINATION OF A REFERENCE ANGLE ON A COLORIMETRIC RESULT

RELATED APPLICATIONS

This is a U.S. National Phase Application under 35 USC 371 of International Application PCT/JP2016/067600 filed on Jun. 14, 2016.

This application claims the priority of Japanese application no. 2015-128544 filed Jun. 26, 2015, the entire content of which is hereby incorporated by reference.

TECHNICAL FIELD

The present invention relates to a multi-angle colorimeter.

BACKGROUND ART

A multi-angle colorimeter is largely classified into an unidirectional light illuminating/multi-directional light receiving type and a multi-directional light illuminating/unidirectional light receiving type. In the multi-angle colorimeter of the unidirectional light illuminating/multi-directional light receiving type, a sample is illuminated from one direction and light reflected from the sample is received from multiple directions. According to the multi-angle colorimeter of the unidirectional light illuminating/multi-directional light receiving type, a colorimetric process is performed at each of a plurality of light receiving angles. In the multi-angle colorimeter of the multi-directional light illuminating/unidirectional light receiving type, a sample is illuminated from multiple directions and light reflected from the sample is received from one direction. According to the multi-angle colorimeter of the multi-directional light illuminating/unidirectional light receiving type, a colorimetric process is performed at each of a plurality of light illuminating angles. The multi-angle colorimeter is suitable for a colorimetric process performed on a sample of which observed color changes depending on an observation direction. As the sample of which the color changes depending on the observation direction, a vehicle body of an automobile having a metallic coating or a pearl coating is known.

In the multi-angle colorimeter, a colorimetric process is desirably performed while a reference axis of the multi-angle colorimeter matches a normal line of a colorimetric region of the sample. However, when the colorimetric region has a curved surface like a bumper of an automobile, there is a case where the reference axis is not easily aligned to the normal line of the colorimetric region and the reference axis is inclined from the normal line of the colorimetric region. Since the colorimetric result is influenced by the inclination of the reference axis line from the normal line of the colorimetric region, an accurate colorimetric result cannot be obtained when the reference axis is inclined from the normal line of the colorimetric region.

In order to solve this problem, in the technique proposed by Patent Literature 1, the spectroscopic measurement is performed twice by using the symmetrically arranged light illuminating and receiving optical systems and an average of the two spectroscopic measurement results is obtained. According to the technique proposed by Patent Literature 1, it is possible to suppress an influence of the inclination of the reference axis from the normal line of the colorimetric region with respect to the spectroscopic measurement result.

CITATION LIST

Patent Literature

Patent Literature 1: WO 2012/147488

SUMMARY OF INVENTION

Technical Problem

In the technique proposed by Patent Literature 1, there is a case where a time necessary for the spectroscopic measurement for two times increases and the colorimetric result is influenced by the shaking of hands. This problem also occurs when a colorimetric process other than the spectroscopic measurement is performed.

The invention described in the detailed description of the invention is used to solve this problem. An object of the invention described in the detailed description of the invention is to suppress an influence on a colorimetric result due to shaking of hands while suppressing an influence on a colorimetric result due to an inclination of a reference axis from a normal line of a colorimetric region.

Solution to Problem

A multi-angle colorimeter includes a light illuminating and receiving optical system, a measurement mechanism, and a measurement control mechanism.

A light illuminating and receiving optical system includes a plurality of light radiating positions and a plurality of light receiving positions. The plurality of light radiating positions is symmetrically arranged with respect to a reference axis passing through a measurement target position. The plurality of light receiving positions is symmetrically arranged with respect to the reference axis. The light illuminating and receiving optical system radiates illumination light from each of the plurality of light radiating positions to the measurement target position and receives reflected light traveling from the measurement target position toward each of the plurality of light receiving positions. The plurality of light radiating positions and the plurality of light receiving positions are arranged so that the radiation of the illumination light and the reception of the reflected light under each of a plurality of geometric conditions are possible.

The measurement mechanism performs a colorimetric process on the reflected light received by the light illuminating and receiving optical system and outputs a colorimetric result.

In the multi-angle colorimeter, a first measurement operation and a second measurement operation are performed according to each of a plurality of geometric conditions defining a light illuminating angle and a light receiving angle while keeping the geometric condition.

In the first measurement operation, the light illuminating and receiving optical system radiates the illumination light from the first light radiating position toward the measurement target position and receives the reflected light traveling from the measurement target position toward the first light receiving position and the measurement mechanism performs a colorimetric process on the reflected light traveling from the measurement target position toward the first light receiving position and outputs a colorimetric result.

In the second measurement operation, the light illuminating and receiving optical system radiates the illumination light from the second light radiating position toward the measurement target position and receives the reflected light traveling from the measurement target position toward the second light receiving position and the measurement mechanism performs a colorimetric process on the reflected light traveling from the measurement target position toward the second light receiving position and outputs a colorimetric result.

It is possible to obtain a colorimetric result corrected based on an average of two colorimetric results.

Each of the first light radiating position and the second light radiating position is any one of the plurality of light radiating positions. Each of the first light receiving position and the second light receiving position is any one of the plurality of light receiving positions. The second light radiating position and the second light receiving position are disposed to be symmetrical to the first light radiating position and the first light receiving position respectively, with respect to the reference axis.

Advantageous Effects of Invention

It is possible to suppress an influence on a colorimetric result due to shaking of hands while suppressing an influence on a colorimetric result due to an inclination of a reference axis from a normal line of a colorimetric region.

These and other objects, features, aspects, and advantages of the invention will become more apparent from the following detailed description of the invention when considered in conjunction with the accompanying drawings.

DESCRIPTION OF EMBODIMENTS

1 Schematic Configuration of Multi-Angle Colorimeter

Figure 1:
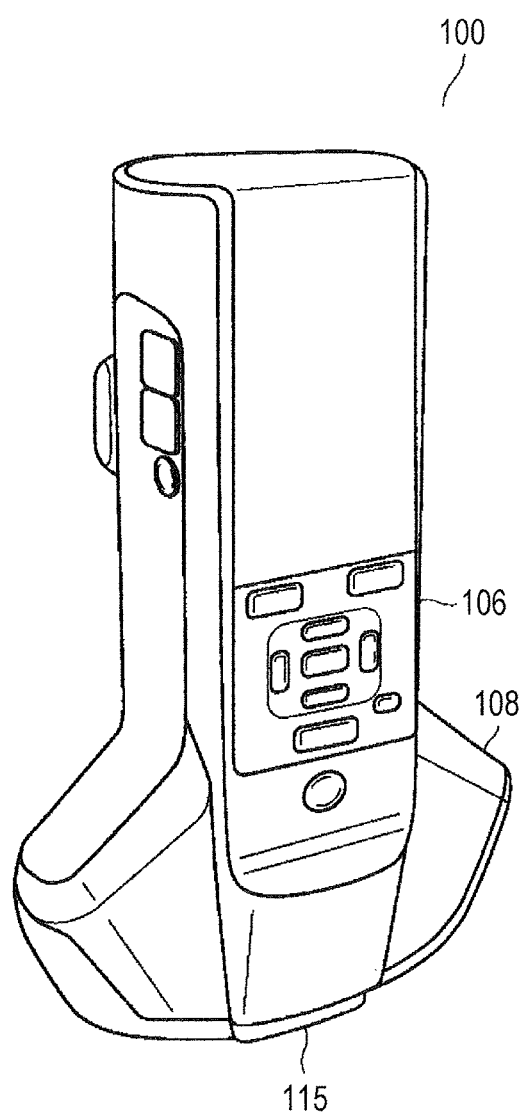
FIG. 1 is a schematic view illustrating a multi-angle colorimeter.
Figure 2:
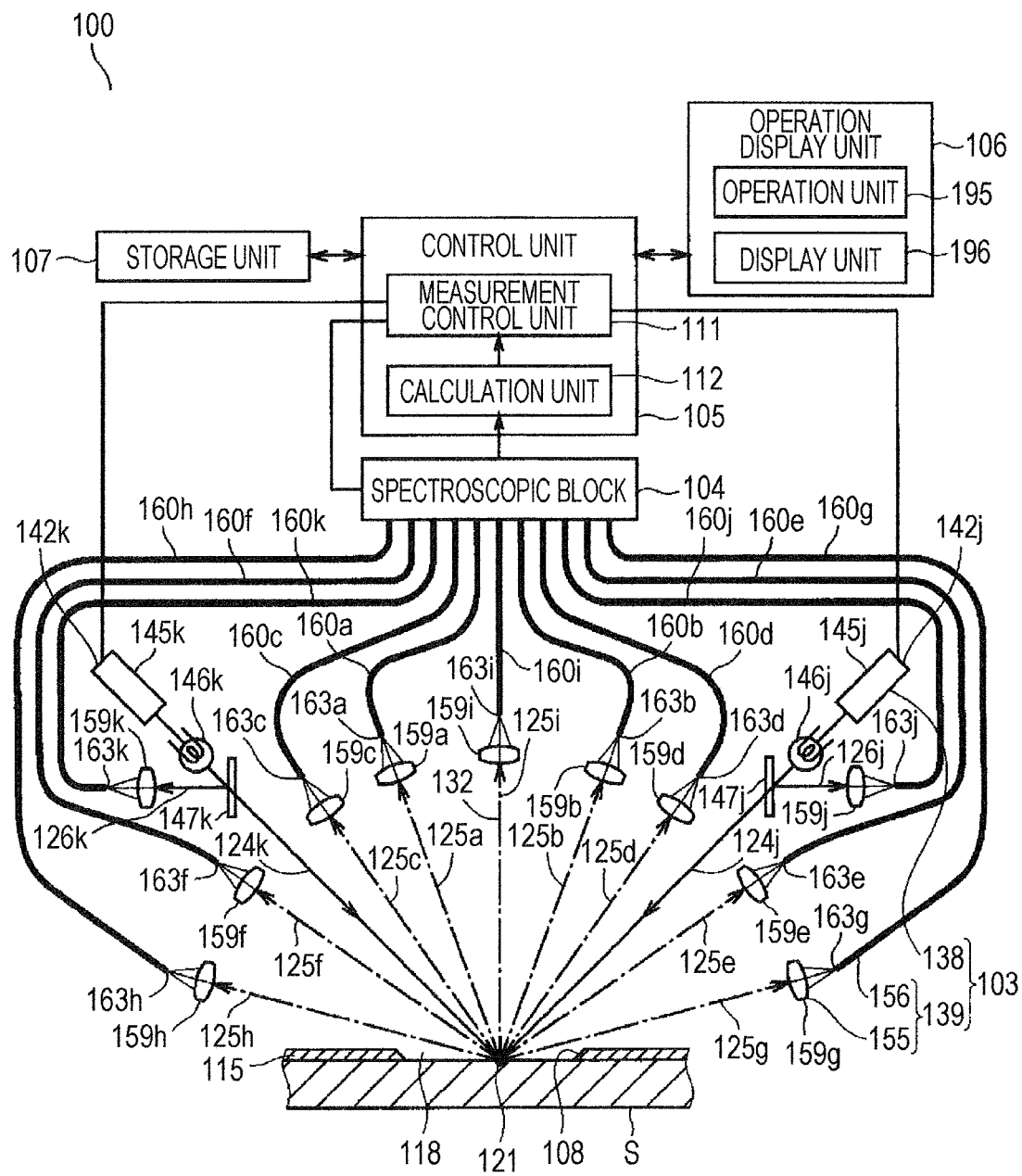
FIG. 2 is a schematic diagram illustrating a multi-angle colorimeter and a sample.
Figure 3:
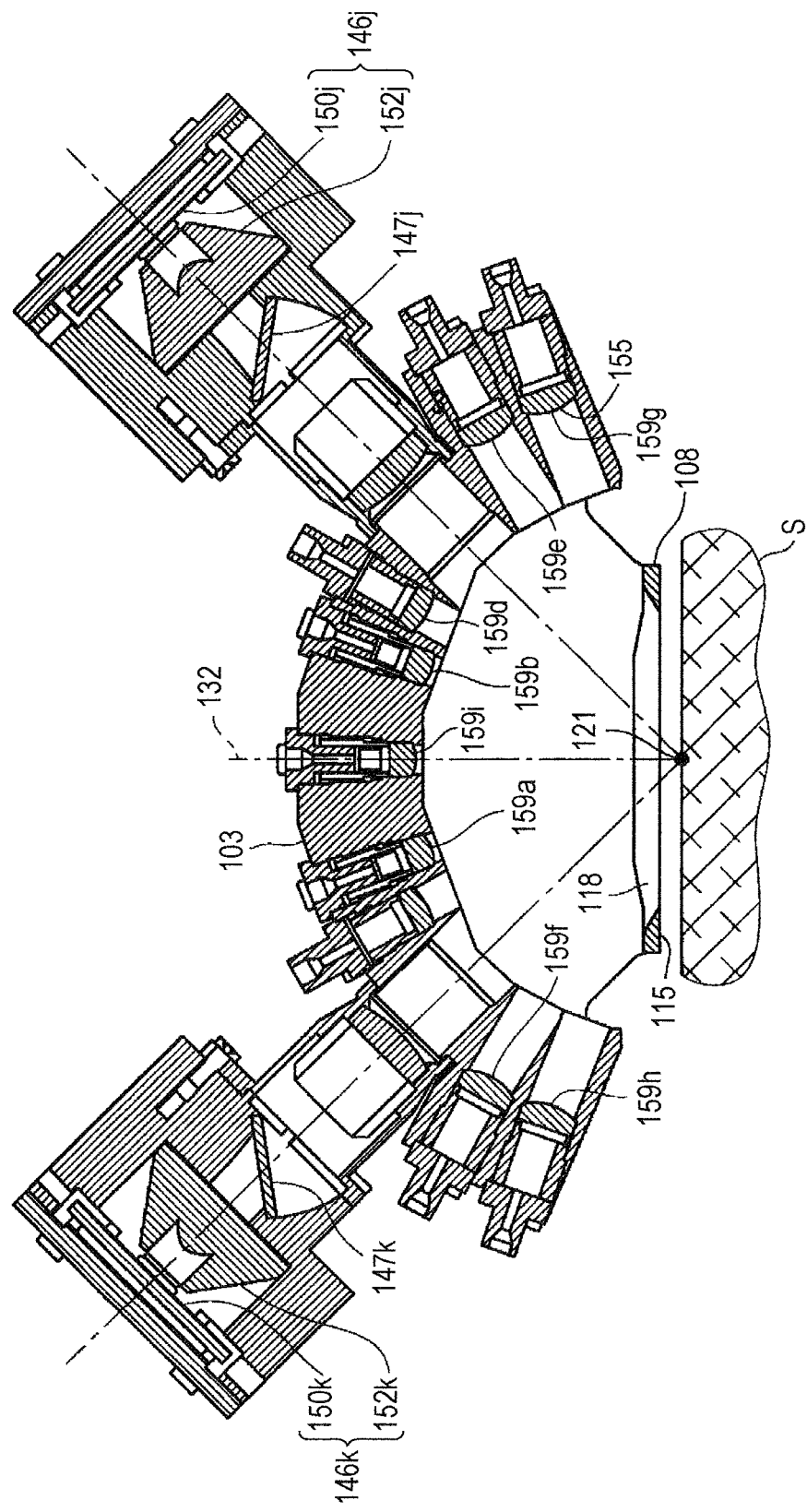
FIG. 3 is a schematic view illustrating a main part of a light illuminating and receiving optical system, a casing, and a sample.
Figure 4:
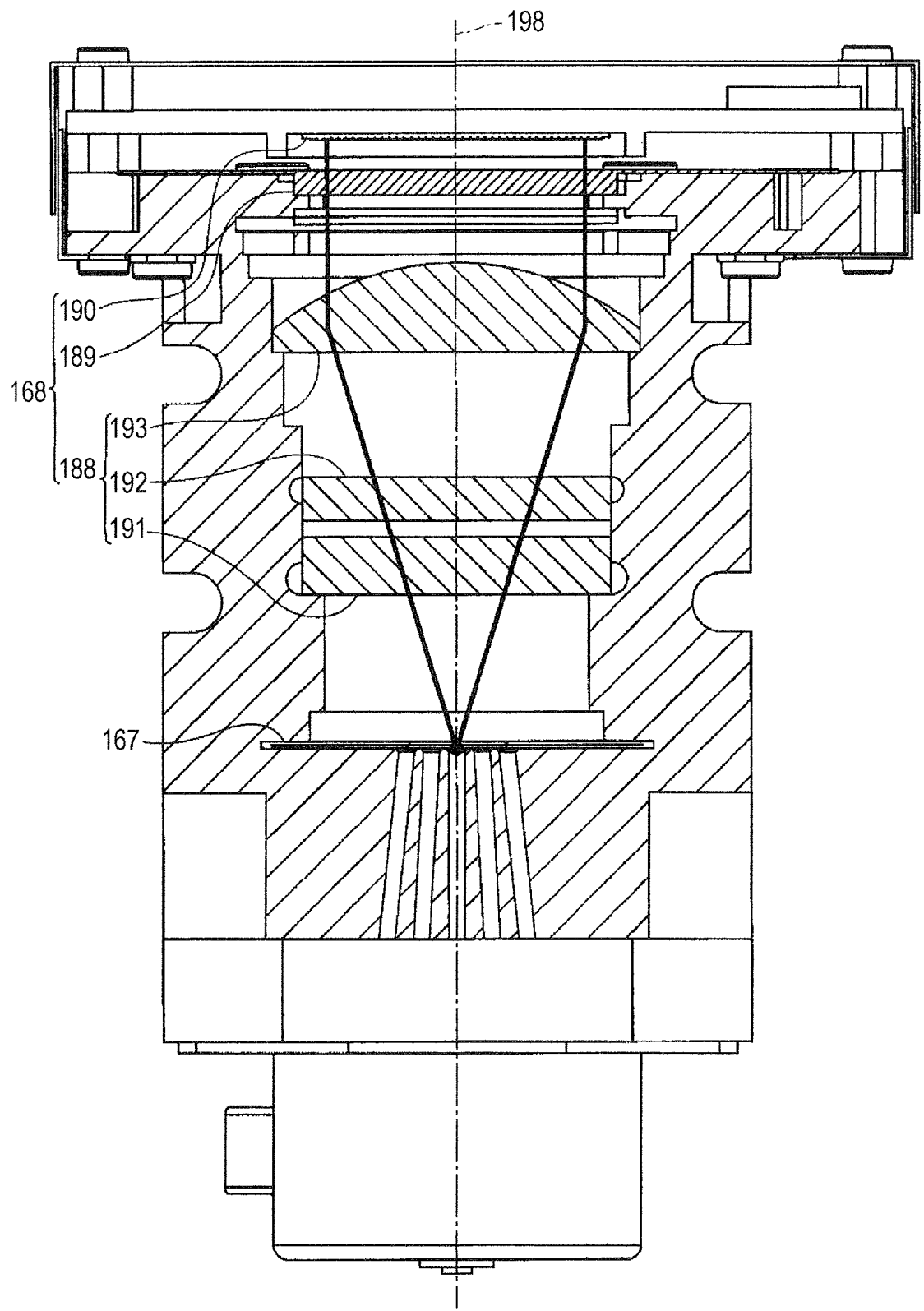
FIG. 4 is a schematic view illustrating a spectroscopic block.

A schematic view of FIG. 1 illustrates a multi-angle colorimeter. FIG. 1 is a perspective view and illustrates an appearance. A schematic diagram of FIG. 2 illustrates a multi-angle colorimeter and a sample. FIG. 2 is a block diagram. A schematic view of FIG. 3 illustrates a main part of a light illuminating and receiving optical system, a casing, and a sample. A schematic view of FIG. 4 illustrates a spectroscopic block. FIGS. 3 and 4 each illustrate a cross-section.

A multi-angle colorimeter 100 of the embodiment includes, as illustrated in FIGS. 1 to 4, a light illuminating and receiving optical system 103, a spectroscopic block 104, a control unit 105, an operation display unit 106, a storage unit 107, and a casing 108. The control unit 105 includes a measurement control unit 111 and a calculation unit 112.

The multi-angle colorimeter 100 is of a unidirectional light illuminating/multi-directional light receiving type, illuminates a sample S from one direction, and receives light reflected from the sample S from multiple directions. Accordingly, it is possible to appropriately measure the color of the sample S of which an observed color is changed in accordance with a colorimetric observation direction at each of a plurality of light receiving angles.

At the time of measuring color, a pressing portion 115 of the casing 108 is pressed against the sample S. When the pressing portion 115 is pressed against the sample S, an opening 118 formed in the casing 108 faces the sample S and a measurement target position 121 is disposed on a surface of the sample S. When the measurement target position 121 is disposed on the surface of the sample S, it is possible to measure the color of the surface of the sample S.

When measuring the color, the measurement control unit 111 controls the light illuminating and receiving optical system 103 and the spectroscopic block 104, the light illuminating and receiving optical system 103 illuminates the sample S and receives light reflected from the sample S, the spectroscopic block 104 performs spectroscopic measurement on the reflected light and outputs a spectroscopic measurement result, the calculation unit 112 calculates a colorimetric value from the spectroscopic measurement result, and the operation display unit 106 displays the colorimetric value.

2 Double Pass Correction 2.1 Influence of Inclination

Figure 5:
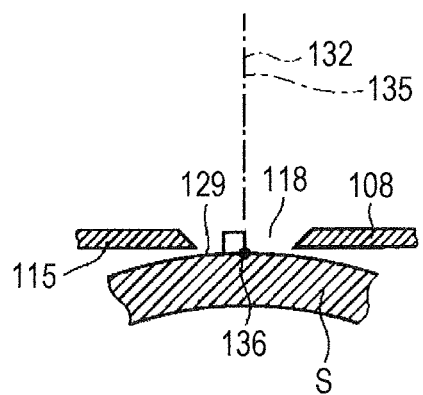
FIG. 5 is a schematic view illustrating a casing and a sample.

A schematic view of FIG. 5 illustrates a casing and a sample. FIG. 5 is a cross-sectional view.

Figure 6:
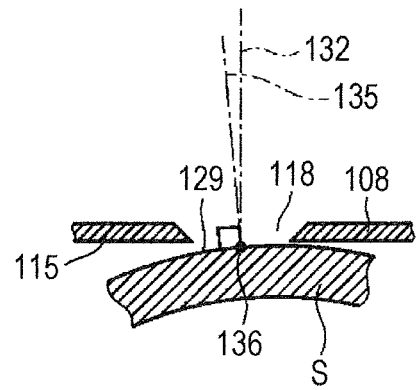
FIG. 6 is a schematic view illustrating a casing and a sample.

At the time of measuring the color, as illustrated in FIG. 5, the pressing portion 115 of the casing 108 is pressed against the sample S so that the opening 118 formed in the casing 108 faces the sample S and a colorimetric process is performed for a colorimetric region 129 facing the opening 118 in the surface of the sample S. Desirably, as illustrated in FIG. 5, the pressing portion 115 is pressed against the sample S so that a reference axis 132 matches a normal line 135 of the colorimetric region 129. The normal line 135 is the normal line of the colorimetric region 129 at an intersection point 136 between the reference axis 132 and the colorimetric region 129. However, when the colorimetric region 129 has a curved surface like a bumper of an automobile, the reference axis 132 cannot be easily and accurately aligned to the normal line 135 and as illustrated in FIG. 6, the reference axis 132 is easily inclined from the normal line 135.

2.2 Advantage of Symmetric Arrangement

In the multi-angle colorimeter 100, a symmetric arrangement in which the light illuminating and receiving optical system 103 is symmetric with respect to the reference axis 132 is adopted.

Hereinafter, an advantage of the symmetric arrangement will be described by exemplifying a simplified light illuminating and receiving optical system including two light radiating positions and two light receiving positions.

Figure 7:
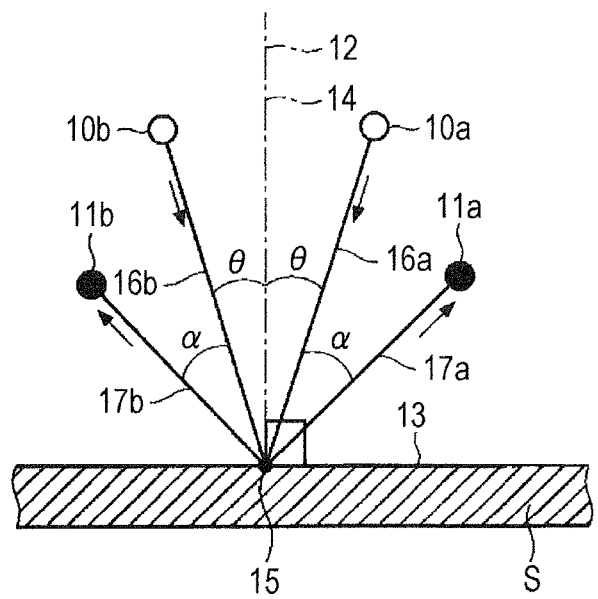
FIG. 7 is a schematic view illustrating a simplified light illuminating and receiving optical system and a sample.
Figure 8:
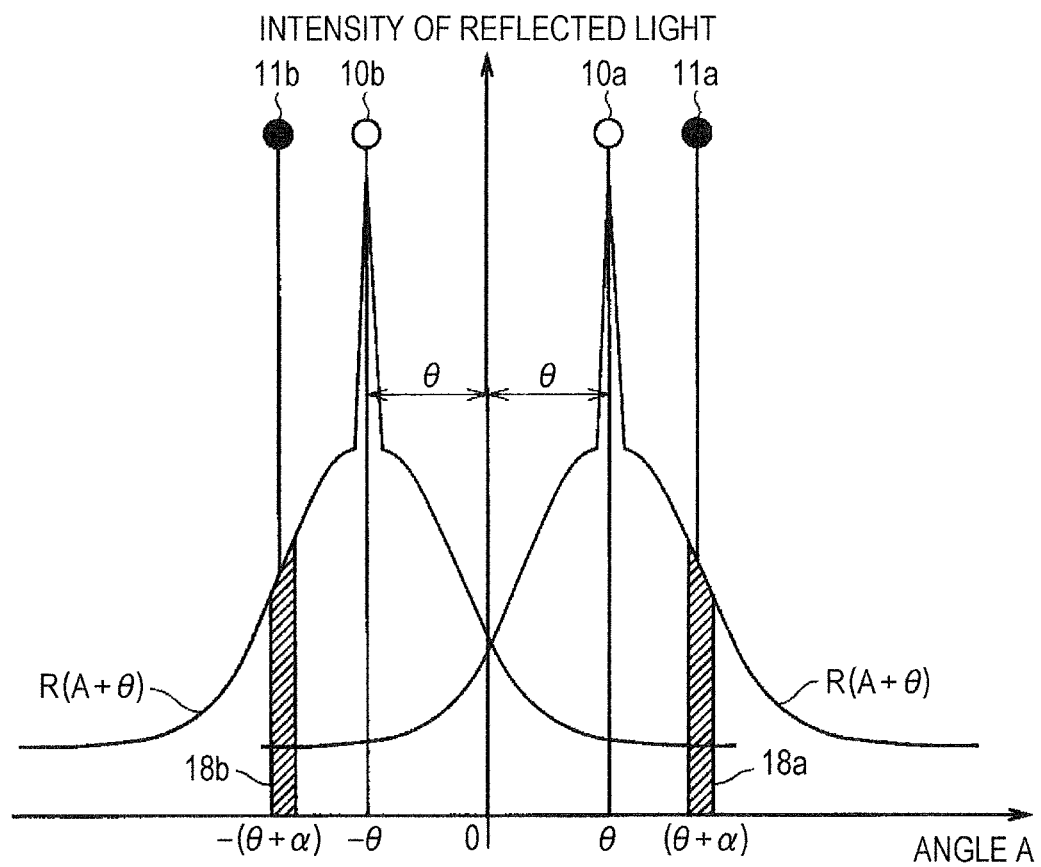
FIG. 8 is a graph illustrating a relation between an angle and intensity of reflected light.
Figure 9:
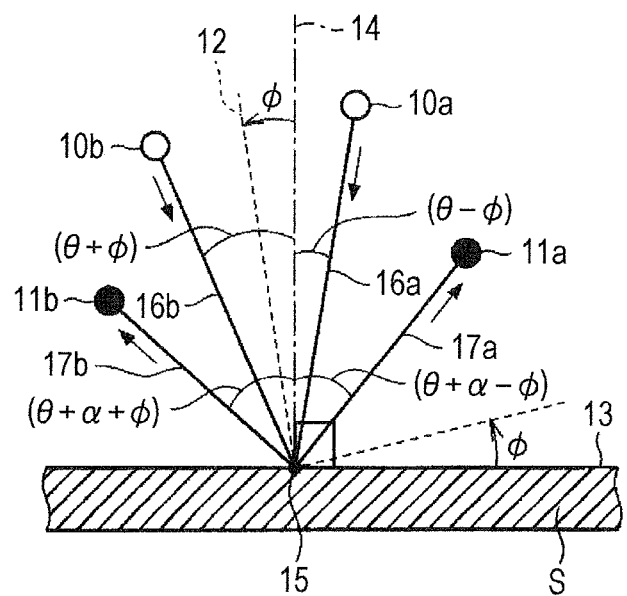
FIG. 9 is a schematic view illustrating a simplified light illuminating and receiving optical system and a sample.
Figure 10:
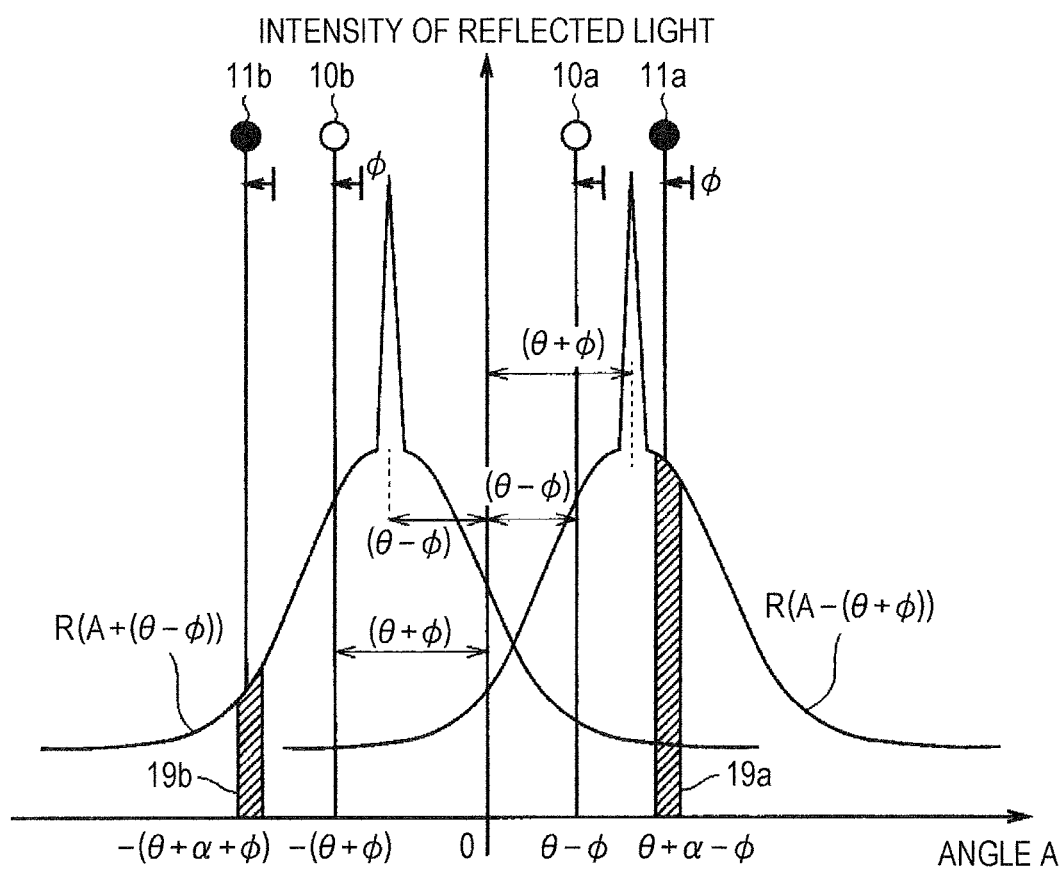
FIG. 10 is a graph illustrating a relation between an angle and intensity of reflected light.

Schematic views and diagram of FIGS. 7 and 9 illustrate a simplified light illuminating and receiving optical system and a sample. Graphs of FIGS. 8 and 10 illustrate a relation between an angle and intensity of reflected light. FIGS. 7 and 8 illustrate a case where a reference axis matches a normal line of a colorimetric region. FIGS. 9 and 10 illustrate a case where the reference axis is inclined from the normal line of the colorimetric region. The angle indicates an inclination from the normal line of the colorimetric region, a positive value is given to a clockwise inclination about a measurement target position from the normal line of the colorimetric region, and a negative value is given to a counterclockwise rotation about the measurement target position from the reference axis.

When a reference axis 12 matches the normal line 14 of the colorimetric region, as illustrated in FIG. 7, light radiating positions 10a and 10b are disposed on virtual lines inclined from the normal line 14 by angles +θ and −θ respectively and light receiving positions 11a and 11b are disposed on virtual lines inclined from the normal line 14 by angles +(θ+α) and −(θ+α) respectively. Illumination light beams 16a and 16b are respectively radiated from the light radiating positions 10a and 10b toward a measurement target position 15. Light beams 17a and 17b reflected from the measurement target position 15 are respectively received at the light receiving positions 11a and 11b. When the illumination light beam 16a is radiated from the light radiating position 10a, the illumination light beam 16a is reflected at the measurement target position 15 to generate the reflected light beams 17a and 17b. When the illumination light beam 16b is radiated from the light radiating position 10b, the illumination light beam 16b is reflected at the measurement target position 15 to generate the reflected light beams 17a and 17b. An optical path of the illumination light beam 16b becomes symmetric to an optical path of the illumination light beam 16a with respect to the reference axis 12. An optical path of the reflected light beam 17b becomes symmetric to an optical path of the reflected light beam 17a with respect to the reference axis 12.

When the illumination light beam 16a is reflected at the measurement target position 15, specular reflected light is generated by specular reflection and diffused reflected light is generated by diffused reflection. Even when the illumination light beam 16b is reflected at the measurement target position 15, specular reflected light is generated by specular reflection and diffused reflected light is generated by diffused reflection. The diffused reflected light is generated in the periphery of the specular reflected light. An optical path of the specular reflected light generated when the illumination light beam 16b is reflected at the measurement target position 15 becomes symmetric to an optical path of the specular reflected light generated when the illumination light beam 16a is reflected at the measurement target position 15 in the reference axis 12.

An angle distribution of the intensity of the reflected light including the specular reflected light and the diffused reflected light indicates a sum of the following three components [i], [ii], and [iii].

[i] A sharp peak component at the angle of the optical path of the specular reflected light.

[ii] A component that attenuates as it goes away from the angle of the optical path of the specular reflected light and can be approximated by a Gauss function while the attenuation at an angle smaller than the angle of the optical path of the specular reflected light and the attenuation at an angle larger than the angle of the optical path of the specular reflected light are symmetric with respect to the angle of the optical path of the specular reflected light.

[iii] A component that attenuates as it goes away from the angle of the normal line 14 and can be approximated by a Cosine function.

A contribution of the component [i] at an angle relatively close to the angle of the optical path of the specular reflected light is large and a contribution of the component [iii] at an angle relatively far from the angle of the optical path of the specular reflected light is large.

For this reason, when the reference axis 12 matches the normal line 14, the intensity of the reflected light generated when the illumination light beam 16a is reflected at the measurement target position 15 is approximately expressed by R(A+θ) and the intensity of the reflected light generated when the illumination light beam 16b is reflected at the measurement target position 15 is approximately expressed by R(A−θ) by using the angle A of the optical path of the reflected light. For this reason, the intensity of the reflected light beam 17a received at the light receiving position 11a when the illumination light beam 16b is radiated from the light radiating position 10b is expressed by R(+α) based on A=+(θ+α) and the intensity of the reflected light beam 17b received at the light receiving position 11b when the illumination light beam 16a is radiated from the light radiating position 10a is expressed by R(−α) based on A=−(θ+α). A relation of R(+α)=R(−α) is established between the intensity R(+α) of the reflected light beam 17a of the hatched angle region 18a in FIG. 8 and the intensity R(−α) of the reflected light beam 17b of the hatched angle region 18b in FIG. 8.

When the reference axis 12 is inclined from the normal line 14 by an angle −φ, as illustrated in FIG. 9, the light radiating positions 10a and 10b are respectively disposed on virtual lines inclined from the normal line 14 by angles +(θ−φ) and −(θ+φ) and the light receiving positions 11a and 11b are respectively disposed on virtual lines inclined from the normal line 14 by angles +(θ+α−φ) and −(θ+α+φ).

When the reference axis 12 is inclined from the normal line 14 by an angle −φ, the intensity of the reflected light generated when the illumination light beam 16a is reflected at the measurement target position 15 is approximately expressed by R(A+(θ−φ)) and the intensity of the reflected light generated when the illumination light beam 16b is reflected at the measurement target position 15 is approximately expressed by R(A−(θ+φ)). For this reason, the intensity of the reflected light beam 17a received at the light receiving position 11a when the illumination light beam 16b is radiated from the light radiating position 10b is expressed by R(+α−2φ) based on A=+(θ+α−) and the intensity of the reflected light beam 17b received at the light receiving position 11b when the illumination light beam 16a is radiated from the light radiating position 10a is expressed by R(−α−2φ) based on A=−(θ+α+φ). A relation of R(+α−2φ) ≠R(−α−2φ) is established between the intensity R(+α−2φ) of the reflected light beam 17a of the hatched angle region 19a in FIG. 10 and the intensity R(−α−2φ) of the reflected light beam 17b of the hatched angle region 19b in FIG. 10.

Thus, when the reference axis 12 is inclined from the normal line 14 by an angle −φ, the intensity of the reflected light beam 17a received at the light receiving position 11a increases and the intensity of the reflected light beam 17b received at the light receiving position 11b decreases compared to a case where the reference axis 12 matches the normal line 14. However, the sum of the intensity of the reflected light beam 17a reflected at the light receiving position 11a and the intensity of the reflected light beam 17b reflected at the light receiving position 11b does not change largely between a case where the reference axis 12 is inclined from the normal line 14 by an angle −φ and a case where the reference axis 12 matches the normal line 14. That is, a relation of $R(+\alpha-2\varphi)+R(-\alpha-2\varphi)=R(+\alpha)+R(-\alpha)$ is established. This relation is established when the angle −φ is small.

In this way, since the intensity of the reflected light obtained by the inclination of the reference axis 12 from the normal line 14 changes when the reflected light is received at only one of the light receiving positions 11a and 11b, it is not possible to obtain an accurate colorimetric result from the obtained intensity of the reflected light. On the contrary, since the intensity of the reflected light corrected by the inclination of the reference axis 12 from the normal line 14 does not change when the reflected light is received at both of the light receiving positions 11a and 11b and the intensity of the reflected light can be obtained based on the average of the intensities of two reflected light beams, it is possible to obtain an accurate colorimetric result from the corrected intensity of the reflected light. In this way, a method of obtaining the intensity of the reflected light corrected based on the average of the intensities of two reflected light beams is called a double pass correction. The double pass correction is also performed when the multi-angle colorimeter is of a multi-directional light illuminating/unidirectional light receiving type.

3 Light Illuminating and Receiving Optical System 3.1 Illumination Mechanism

The light illuminating and receiving optical system 103 includes, as illustrated in FIG. 2, an illumination mechanism 138. The illumination mechanism 138 includes illumination units 142j and 142k. The illumination unit 142j includes a light emitting circuit 145j, a radiation mechanism 146j, and a beam splitter 147j. The illumination unit 142k includes a light emitting circuit 145k, a radiation mechanism 146k, and a beam splitter 147k. The radiation mechanism 146j includes, as illustrated in FIG. 3, a light emitting diode 150j and a collimating lens 152j. The radiation mechanism 146k includes, as illustrated in FIG. 3, a light emitting diode 150k and a collimating lens 152k.

When a illumination light beam 124j is radiated to the illumination unit 142j, the measurement control unit 111 controls the light emitting circuit 145j so that electric power is supplied from the light emitting circuit 145j to the radiation mechanism 146j and hence the electric power supplied to the radiation mechanism 146j is supplied to the light emitting diode 150j. The light emitting diode 150j to which the electric power is supplied radiates the illumination light beam 124j. Accordingly, the illumination light beam 124j is radiated from the light radiating position where the light emitting diode 150j is disposed. The radiated illumination light beam 124j is collimated by the collimating lens 152j. A part of the collimated illumination light beam 124j passes through the beam splitter 147j and travels toward the measurement target position 121. A part of the collimated illumination light beam 124j is reflected by the beam splitter 147j and is branched from the illumination light beam 124j traveling toward the measurement target position 15 to become a monitoring illumination light beam 126j.

When a illumination light beam 124k is radiated to the illumination unit 142k, the measurement control unit 111 controls the light emitting circuit 145k so that electric power is supplied from the light emitting circuit 145k to the radiation mechanism 146k and hence the electric power supplied to the radiation mechanism 146k is supplied to the light emitting diode 150k. The light emitting diode 150k to which the electric power is supplied radiates the illumination light beam 124k. Accordingly, the illumination light beam 124k is radiated from a light radiating position where the light emitting diode 150k is disposed. The radiated illumination light beam 124k is collimated by the collimating lens 152k. A part of the collimated illumination light beam 124k passes through the beam splitter 147k and travels toward the measurement target position 121. A part of the collimated illumination light beam 124k is reflected by the beam splitter 147k and is branched from the collimated illumination light beam 124k traveling toward the measurement target position 121 to become a monitoring illumination light beam 126k.

The light radiating position is a position for defining the light illuminating angle of the illumination light. For this reason, when the illumination light passes through a bending optical system, a position where the illumination light is emitted from the bending optical system, not a position where the light source is disposed, becomes the light radiating position.

A configuration of the illumination mechanism 138 may be changed. For example, the light emitting circuits 145j and 145k may be omitted and the measurement control unit 111 may directly supply electric power to the light emitting diodes 150j and 150k.

The light emitting diodes 150j and 150k have an advantage that light can be turned on and off in a short time. This point contributes to a case where the double pass correction to be described later can be completed in a short time. However, the light emitting diodes 150j and 150k may be replaced by a different kind of light source. For example, the light emitting diodes 150j and 150k may be replaced by a Xenon flash lamp.

3.2 Light Receiving Mechanism

The light illuminating and receiving optical system 103 further includes, as illustrated in FIG. 2, a light receiving mechanism 139. The light receiving mechanism 139 includes a lens group 155 and a light guiding mechanism 156.

Figure 11:
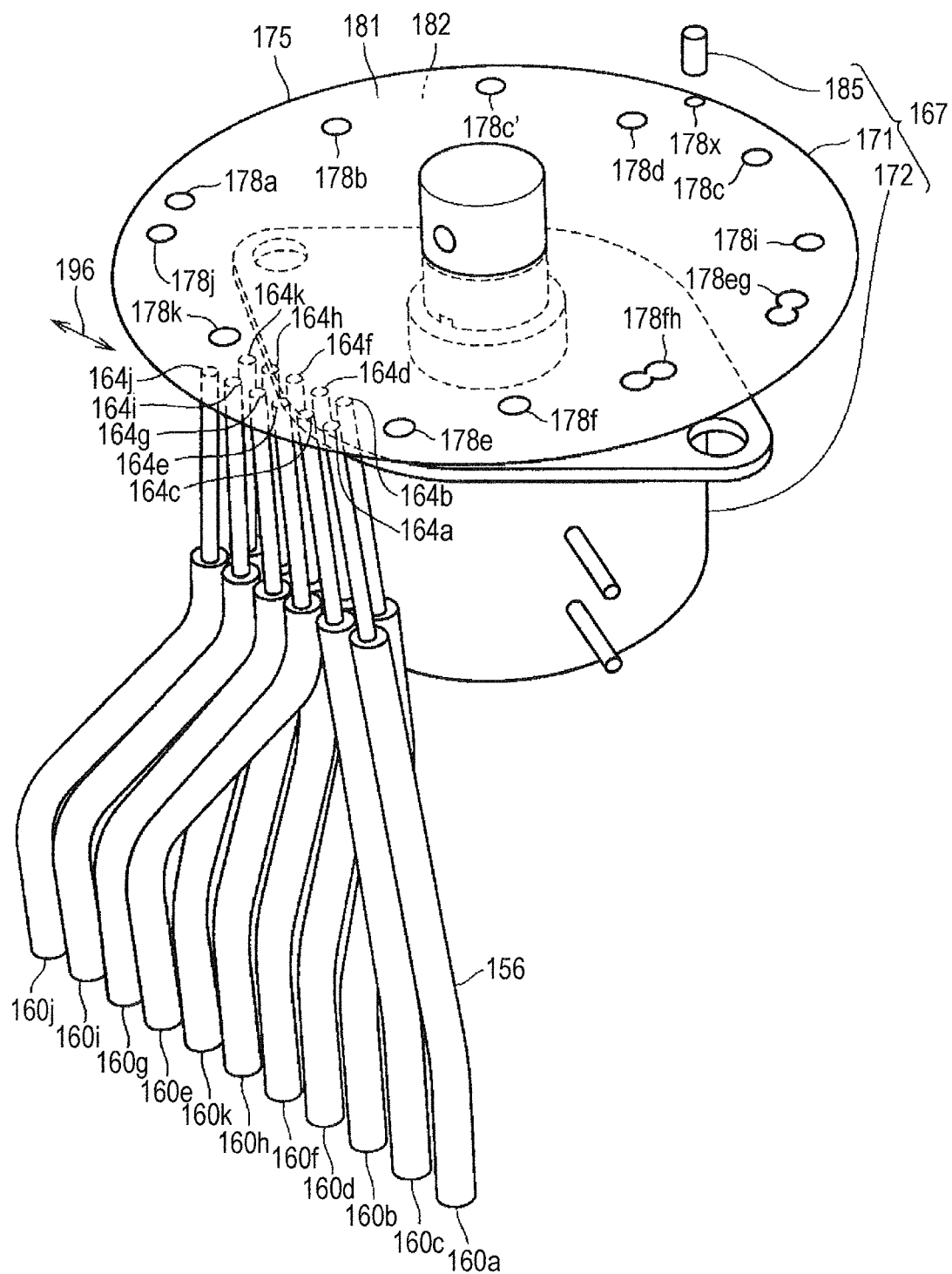
FIG. 11 is a schematic view illustrating a switching mechanism and a light guiding mechanism.
Figure 12:
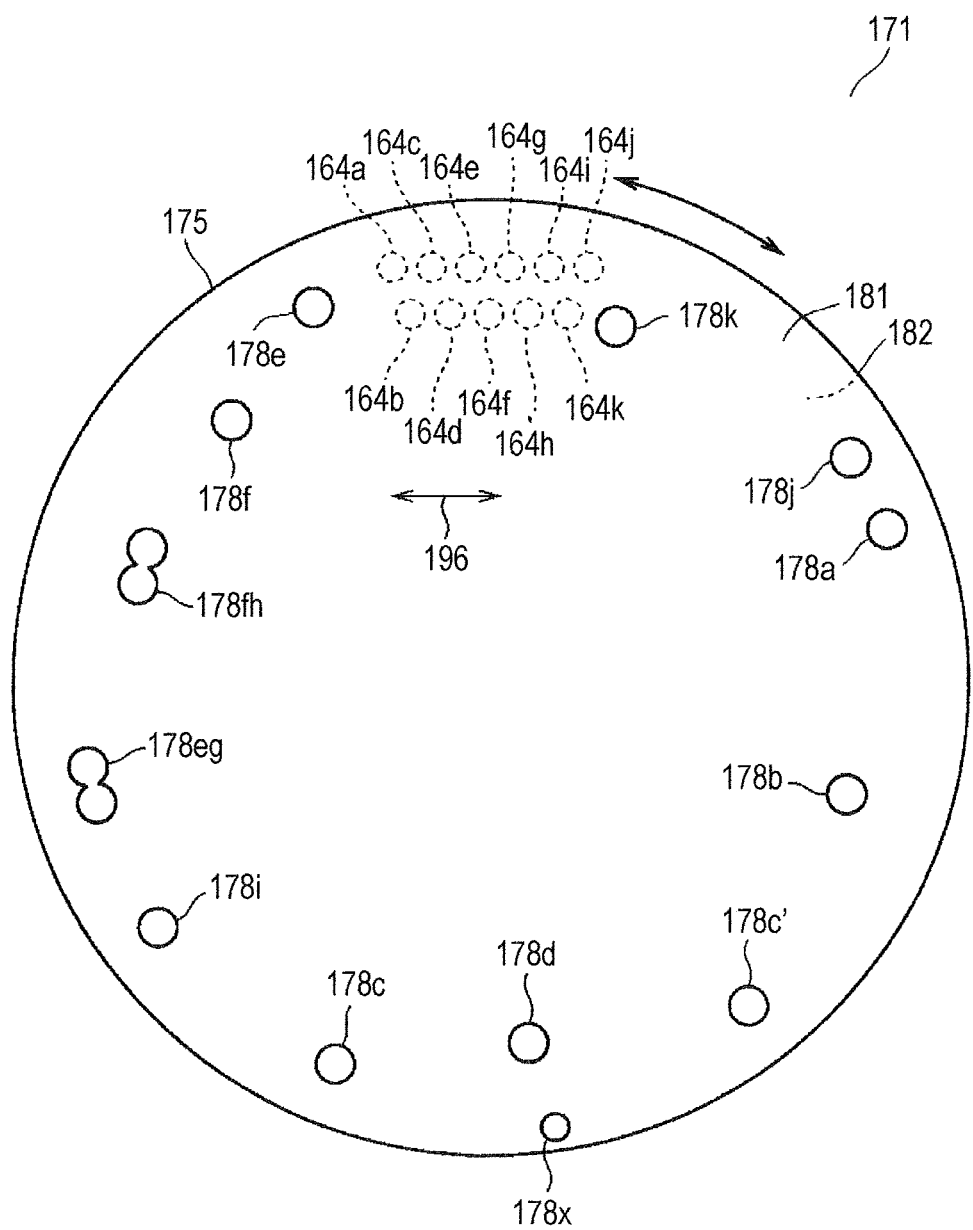
FIG. 12 is a schematic view illustrating a rotation body and a light receiving mechanism.

The lens group 155 includes lenses 159a, 159b, 159c, 159d, 159e, 159f, 159g, 159h, 159i, 159j, and 159k. The light guiding mechanism 156 includes optical fibers 160a, 160b, 160c, 160d, 160e, 160f, 160g, 160h, 160i, 160j, and 160k. The optical fibers 160a, 160b, 160c, 160d, 160e, 160f, 160g, 160h, 160i, 160j, and 160k respectively include light incident ports 163a, 163b, 163c, 163d, 163e, 163f, 163g, 163h, 163i, 163j, and 163k and respectively include light emitting ports 164a, 164b, 164c, 164d, 164e, 164f, 164g, 164h, 164i, 164j, and 164k as illustrated in FIGS. 11 and 12.

Reflected light beams 125a, 125b, 125c, 125d, 125e, 125f, 125g, 125h, and 125i are generated when the illumination light beam 124j or 124k is reflected at the measurement target position 121, travel from the measurement target position 121 toward the light incident ports 163a, 163b, 163c, 163d, 163e, 163f, 163g, 163h, and 163i, and are converged by the lenses 159a, 159b, 159c, 159d, 159e, 159f, 159g, 159h, and 159i on the way. The converged reflected light beams 125a, 125b, 125c, 125d, 125e, 125f, 125g, 125h, and 125i are respectively received at light receiving positions where the light incident ports 163a, 163b, 163c, 163d, 163e, 163f, 163g, 163h, and 163i are disposed and are respectively incident to the light incident ports 163a, 163b, 163c, 163d, 163e, 163f, 163g, 163h, and 163i. The incident reflected light beams 125a, 125b, 125c, 125d, 125e, 125f, 125g, 125h, and 125i are respectively guided to the light emitting ports 164a, 164b, 164c, 164d, 164e, 164f, 164g, 164h, and 164i. The guided reflected light beams 125a, 125b, 125c, 125d, 125e, 125f, 125g, 125h, and 125i are respectively emitted from the light emitting ports 164a, 164b, 164c, 164d, 164e, 164f, 164g, 164h, and 164i.

The monitoring illumination light beam 126j is generated when the illumination light beam 124j is reflected by the beam splitter 147j, travels from the beam splitter 147j toward the light incident port 163j, and is converged by the lens 159j on the way. The converged monitoring illumination light beam 126j is received at a light receiving position where the light incident port 163j is disposed and is incident to the light incident port 163j. The incident monitoring illumination light beam 126j is guided to the light emitting port 164j. The guided monitoring illumination light beam 126j is emitted from the light emitting port 164j. The monitoring illumination light beam 126k is generated when the illumination light beam 124k is reflected by the beam splitter 147k, travels from the beam splitter 147k toward the light incident port 163k, and is converged by the lens 159k on the way. The converged monitoring illumination light beam 126k is received at a light receiving position where the light incident port 163k is disposed and is incident to the light incident port 163k. The incident monitoring illumination light beam 126k is guided to the light emitting port 164k. The guided monitoring illumination light beam 126k is emitted from the light emitting port 164k.

The light receiving position is a position for defining the light receiving angle of the reflected light. For this reason, when the reflected light passes through a bending optical system, a position where the reflected light is incident to the bending optical system, not a position where the light incident port is disposed, becomes the light receiving position.

A configuration of the light receiving mechanism 139 may be changed. For example, a part or all of the light guided by the optical fibers 160a, 160b, 160c, 160d, 160e, 160f, 160g, 160h, 160i, 160j, and 160k may be guided by an optical element other than an optical fiber such as a mirror.

4 Spectroscopic Block

The spectroscopic block 104 includes, as illustrated in FIG. 4, a switching mechanism 167 and a spectroscopic measurement mechanism 168.

The switching mechanism 167 does not interrupt light belonging to a candidate selected from a plurality of candidates for the light corresponding to a spectroscopic measurement target and interrupts light not belonging to the candidate selected from the plurality of candidates. The switching mechanism 167 can switch a candidate selected from the plurality of candidates.

A first candidate includes the monitoring illumination light beam 126j emitted from the light emitting port 164j. A second candidate includes the monitoring illumination light beam 126k emitted from the light emitting port 164k. A third candidate includes the reflected light beam 125e emitted from the light emitting port 164e. A fourth candidate includes the reflected light beam 125f emitted from the light emitting port 164f. A fifth candidate includes the reflected light beams 125f and 125h respectively emitted from the light emitting ports 164f and 164h. A sixth candidate includes the reflected light beams 125e and 125g respectively emitted from the light emitting ports 164e and 164g. A seventh candidate includes the reflected light beam 125i emitted from the light emitting port 164i. An eighth candidate includes the reflected light beam 125c emitted from the light emitting port 164c. A ninth candidate includes the reflected light beam 125d emitted from the light emitting port 164d. A tenth candidate includes the reflected light beam 125c emitted from the light emitting port 164c. An eleventh candidate includes the reflected light beam 125b emitted from the light emitting port 164b. A twelfth candidate includes the reflected light beam 125a emitted from the light emitting port 164a.

The spectroscopic measurement mechanism 168 performs spectroscopic measurement for the monitoring illumination light or the reflected light not interrupted by the switching mechanism 167 and outputs a spectroscopic measurement result.

The spectroscopic measurement mechanism 168 may be replaced by a measurement mechanism other than the spectroscopic measurement mechanism and the spectroscopic measurement may be replaced by a colorimetric process other than the spectroscopic measurement. For example, the spectroscopic measurement mechanism 168 may be replaced by a mechanism for measuring a tristimulus value and the spectroscopic measurement may be replaced by tristimulus value measurement.

5 Symmetric Arrangement

The multi-angle colorimeter 100 includes an arrangement plane having the reference axis 132 passing through the measurement target position 121. The light emitting diodes 150j and 150k, the measurement target position 121, the lenses 159a, 159b, 159c, 159d, 159e, 159f, 159g, 159h, 159i, 159j, and 159k, the light incident ports 163a, 163b, 163c, 163d, 163e, 163f, 163g, 163h, 163i, 163j, and 163k and the monitoring illumination light beams 126j and 126k are arranged on the arrangement plane. For this reason, the illumination light beams 124j and 124k, the reflected light beams 125a, 125b, 125c, 125d, 125e, 125f, 125g, 125h, and 125i, and the monitoring illumination light beams 126j and 126k travel on the arrangement plane. It is also allowed that the monitoring illumination light beams 126j and 126k do not travel on the arrangement plane.

The light emitting diodes 150j and 150k are symmetrically disposed with respect to the reference axis 132. The lenses 159a, 159b, 159c, 159d, 159e, 159f, 159g, 159h, and 159i are symmetrically disposed with respect to the reference axis 132. The light incident ports 163a, 163b, 163c, 163d, 163e, 163f, 163g, 163h, and 163i are symmetrically disposed with respect to the reference axis 132.

Hereinafter, an angle indicating the inclination of the optical path of the illumination light from the reference axis 132 will be referred to as a light illuminating angle of the illumination light and an angle indicating the inclination of the optical path of the reflected light from the reference axis 132 will be referred to as a light receiving angle of the reflected light. The light illuminating angle and the light receiving angle have positive values.

The light emitting diode 150k and the light emitting diode 150j are symmetrically disposed with respect to the reference axis 132. For this reason, the light illuminating angle of the illumination light beam 124k is the same as the light illuminating angle of the illumination light beam 124j. The light illuminating angle of the illumination light beam 124j and the light illuminating angle of the illumination light beam 124k are 45°.

The light incident port 163b and the light incident port 163a are symmetrically disposed with respect to the reference axis 132. For this reason, the light receiving angle of the reflected light beam 125b is the same as the light receiving angle of the reflected light beam 125a. The light receiving angle of the reflected light beam 125a and the light receiving angle of the reflected light beam 125b are 20°.

The light incident port 163d and the light incident port 163c are symmetrically disposed with respect to the reference axis 132. For this reason, the light receiving angle of the reflected light beam 125d is the same as the light receiving angle of the reflected light beam 125c. The light receiving angle of the reflected light beam 125c and the light receiving angle of the reflected light beam 125d are 30°.

The light incident port 163f and the light incident port 163e are symmetrically disposed with respect to the reference axis 132. For this reason, the light receiving angle of the reflected light beam 125f is the same as the light receiving angle of the reflected light beam 125e. The light receiving angle of the reflected light beam 125e and the light receiving angle of the reflected light beam 125f are 60°.

The light incident port 163h and the light incident port 163g are symmetrically disposed with respect to the reference axis 132. For this reason, the light receiving angle of the reflected light beam 125h is the same as the light receiving angle of the reflected light beam 125g. The light receiving angle of the reflected light beam 125g and the light receiving angle of the reflected light beam 125h are 70°.

A light incident port 163i is disposed on the reference axis 132. A light receiving angle of the reflected light beam 125i is 0°.

6 Geometric Condition

Hereinafter, an angle indicating the inclination of the optical path of the reflected light from the specular reflection direction will be referred to as an aspecular angle (AS angle) of the reflected light. The AS angle of the reflected light has a positive value when the optical path of the reflected light is inclined in a direction from the specular reflection direction toward the reference axis 132 and has a negative value when the optical path of the reflected light is inclined in a direction opposite to the direction from the specular reflection direction toward the reference axis 132.

According to the arrangement of the light emitting diodes 150j and 150k and the light incident ports 163a, 163b, 163c, 163d, 163e, 163f, 163g, 163h, and 163i, the radiating of the illumination light and the receiving of the reflected light are possible according to geometric conditions 1, 2, 3, 4, 5, and 6 illustrated in Table 1 and the spectroscopic measurement is possible to according to the geometric conditions 1, 2, 3, 4, 5, and 6 illustrated in Table 1. Table 1 illustrates the light emitting diode radiating the illumination light, the light incident port into which the reflected light corresponding to the spectroscopic measurement target is incident, the light illuminating angle of the illumination light, the light receiving angle of the reflected light corresponding to the spectroscopic measurement target, and the AS angle of the reflected light corresponding to the spectroscopic measurement target during the spectroscopic measurement according to the geometric conditions 1, 2, 3, 4, 5, and 6. Each of the geometric conditions 1, 2, 3, 4, 5, and 6 can be defined by a combination of the light illuminating angle of the illumination light and the light receiving angle of the reflected light.

TABLE 1

| Geometric condition | Light emitting diode | Light incident port | Light illuminating angle | Light receiving angle | AS angle |
|---|---|---|---|---|---|
| 1 | 150j | 163f | 45° | 60° | −15° |
|   | 150k | 163e |     |     |     |
| 2 | 150j | 163c | 45° | 30° | 15° |
|   | 150k | 163d |     |     |     |
| 3 | 150j | 163a | 45° | 20° | 25° |
|   | 150k | 163b |     |     |     |

TABLE 1-continued

| Geometric condition | Light emitting diode | Light incident port | Light illuminating angle | Light receiving angle | AS angle |
|---|---|---|---|---|---|
| 4 | 150j | 163i | 45° | 0° | 45° |
|   | 150k | 163i |     |    |     |
| 5 | 150j | 163d | 45° | 30° | 75° |
|   | 150k | 163c |     |     |     |
| 6 | 150j | 163e | 45° | 65° | 110° |
|   |      | 163g |     |     |      |
|   | 150k | 163f |     |     |      |
|   |      | 163h |     |     |      |

When the light emitting diode 150j radiates the illumination light beam 124j in the case of the spectroscopic measurement according to the geometric condition 1, the spectroscopic measurement is performed on the reflected light beam 125f. When the light emitting diode 150k radiates the illumination light beam 124k in the case of the spectroscopic measurement using the geometric condition 1, the spectroscopic measurement is performed on the reflected light beam 125e. In any case, the light illuminating angle of the illumination light is 45°, the light receiving angle of the reflected light is 60°, and the AS angle of the reflected light is −15°.

When the light emitting diode 150j radiates the illumination light beam 124j in the case of the spectroscopic measurement according to the geometric condition 2, the spectroscopic measurement is performed on the reflected light beam 125c incident to the light incident port 163c. When the light emitting diode 150k radiates the illumination light beam 124k in the case of the spectroscopic measurement according to the geometric condition 2, the spectroscopic measurement is performed on the reflected light beam 125d incident to the light incident port 163d. In any case, the light illuminating angle of the illumination light is 45°, the light receiving angle of the reflected light is 30°, and the AS angle of the reflected light is 15°.

When the light emitting diode 150j radiates the illumination light beam 124j in the case of the spectroscopic measurement according to the geometric condition 3, the spectroscopic measurement is performed on the reflected light beam 125a incident to the light incident port 163a. When the light emitting diode 150k radiates the illumination light beam 124k in the case of the spectroscopic measurement according to the geometric condition 3, the spectroscopic measurement is performed on the reflected light beam 125b incident to the light incident port 163b. In any case, the light illuminating angle of the illumination light is 45°, the light receiving angle of the reflected light is 20°, and the AS angle of the reflected light is 25°.

When the light emitting diode 150j radiates the illumination light beam 124j in the case of the spectroscopic measurement according to the geometric condition 4, the spectroscopic measurement is performed on the reflected light beam 125i incident to the light incident port 163i. When the light emitting diode 150k radiates the illumination light beam 124k in the case of the spectroscopic measurement according to the geometric condition 4, the spectroscopic measurement is performed on the reflected light beam 125i incident to the light incident port 163i. In any case, the light illuminating angle of the illumination light is 45°, the light receiving angle of the reflected light is 0°, and the AS angle of the reflected light is 45°.

When the light emitting diode 150j radiates the illumination light beam 124j in the case of the spectroscopic measurement according to the geometric condition 5, the spectroscopic measurement is performed on the reflected light beam 125d incident to the light incident port 163d. When the light emitting diode 150k radiates the illumination light beam 124k in the case of the spectroscopic measurement according to the geometric condition 5, the spectroscopic measurement is performed on the reflected light beam 125c incident to the light incident port 163c. In any case, the light illuminating angle of the illumination light is 45°, the light receiving angle of the reflected light is 30°, and the AS angle of the reflected light is 75°.

When the light emitting diode 150j radiates the illumination light beam 124j in the case of the spectroscopic measurement according to the geometric condition 6, the spectroscopic measurement is performed on the mixed light of the reflected light beams 125e and 125g respectively incident to the light incident ports 163e and 163g. When the light emitting diode 150k radiates the illumination light beam 124k in the case of the spectroscopic measurement according to the geometric condition 6, the spectroscopic measurement is performed on the mixed light of the reflected light beams 125f and 125h respectively incident to the light incident ports 163f and 163h. In any case, the light illuminating angle of the illumination light is 45°, the light receiving angle of the reflected light is 65°, and the AS angle of the reflected light is 110°. A light incident port into which the reflected light of which the light receiving angle is 65° and the AS angle is 110° is incident may be provided and the spectroscopic measurement may be performed on the reflected light received by the light incident port.

Since the light emitting diodes 150j and 150k are symmetrically disposed with respect to the reference axis 132 and the light incident ports 163a, 163b, 163c, 163d, 163e, 163f, 163g, 163h, and 163i are symmetrically disposed with respect to the reference axis 132, the spectroscopic measurement according to each of the geometric conditions 1, 2, 3, 4, 5, and 6 may be any one of the spectroscopic measurement (hereinafter, referred to as "main spectroscopic measurement") in which the light emitting diode 150j radiates the illumination light beam 124j and the spectroscopic measurement (hereinafter, referred to as "auxiliary spectroscopic measurement") in which the light emitting diode 150k radiates the illumination light beam 124k. In the multi-angle colorimeter 100, in any one of the geometric conditions 1, 2, 3, 4, 5, and 6, both the main spectroscopic measurement and the auxiliary spectroscopic measurement are performed and the double pass correction is performed by a main spectroscopic measurement result and an auxiliary spectroscopic measurement result.

The light emitting diode and the light incident port may be disposed so that the radiating of the illumination light and the receiving of the reflected light are possible according to a plurality of geometric conditions different from the geometric conditions 1, 2, 3, 4, 5, and 6.

7 Switching Mechanism

A schematic view of FIG. 11 illustrates a switching mechanism and a light guiding mechanism of the multi-angle colorimeter. FIG. 11 is a perspective view. A schematic view of FIG. 12 illustrates a rotation body and a light guiding mechanism of the multi-angle colorimeter. FIG. 12 is a plan view.

The switching mechanism 167 includes, as illustrated in FIG. 11, a rotation body 171 and a stepping motor 172. The rotation body 171 includes a disk-shaped structure 175.

The disk-shaped structure 175 is a light shielding object.

The disk-shaped structure 175 includes windows 178j, 178k, 178e, 178f, 178fh, 178eg, 178i, 178c, 178d, 178c', 178b, and 178a respectively corresponding to the first candidate, the second candidate, the third candidate, the fourth candidate, the fifth candidate, the sixth candidate, the seventh candidate, the eighth candidate, the ninth candidate, the tenth candidate, the eleventh candidate, and the twelfth candidate.

Each of the windows 178j, 178k, 178e, 178f, 178fh, 178eg, 178i, 178c, 178d, 178c', 178b, and 178a is formed in the disk-shaped structure 175 and has a hollow penetration hole extending from one principal surface 181 of the disk-shaped structure 175 to the other principal surface 182 of the disk-shaped structure 175. Each of the windows 178j, 178k, 178e, 178f, 178fh, 178eg, 178i, 178c, 178d, 178c', 178b, and 178a may include the penetration hole and further include a light transmitting body inserted into the penetration hole.

When any one window of the windows 178j, 178k, 178e, 178f, 178fh, 178eg, 178i, 178c, 178d, 178c', 178b, and 178a is disposed on the optical path of the light belonging to the corresponding candidate, the corresponding one window selectively allows the passage of the light belonging to the corresponding candidate and the disk-shaped structure 175 interrupts the light not belonging to the candidate corresponding to the corresponding one window. For example, the window 178j corresponds to the first candidate, the monitoring illumination light beam 126j belongs to the first candidate, and the monitoring illumination light beam 126k and the reflected light beams 125a, 125b, 125c, 125d, 125e, 125f, 125g, 125h, and 125i do not belong to the first candidate. For this reason, when the window 178j is disposed on the optical path of the monitoring illumination light beam 126j, the window 178j allows the passage of the monitoring illumination light beam 126j and the disk-shaped structure 175 interrupts the monitoring illumination light beam 126k and the reflected light beams 125a, 125b, 125c, 125d, 125e, 125f, 125g, 125h, and 125i.

The windows 178j, 178k, 178e, 178f, 178fh, 178eg, 178i, 178c, 178d, 178c', 178b, and 178a are distributed in the circumferential direction of the disk-shaped structure 175.

The stepping motor 172 can switch the candidate from the first candidate to the twelfth candidate by rotating the rotation body 171 in the circumferential direction of the disk-shaped structure 175 from a state where the light belonging to one candidate passes through the window corresponding to the corresponding one candidate to a state where the light belonging to other candidates passes through the window corresponding to the corresponding other candidates. A rotation mechanism which is the stepping motor 172 may be replaced by other kinds of rotation mechanism.

The switching mechanism 167 may be replaced by other kinds of switching mechanism. For example, the switching mechanism 167 may be replaced by a switching mechanism which includes a plurality of shutters respectively corresponding to the light incident ports 163a, 163b, 163c, 163d, 163e, 163f, 163g, 163h, 163i, 163j, and 163k and a mechanism controlling the plurality of shutters so that the light not belonging to the candidate selected from the plurality of candidate is interrupted while the light belonging to the candidate selected from the plurality of candidates is not interrupted.

The switching mechanism 167 may be omitted. For example, when eleven spectroscopic measurement mechanisms are provided to perform the spectroscopic measurement on each of eleven light beams including the monitoring illumination light beams 126j and 126k and the reflected light beams 125a, 125b, 125c, 125d, 125e, 125f, 125g, 125h, and 125i, there is no need to switch the spectroscopic measurement mechanisms.

A transition from a state where the light belonging to one candidate passes through the window corresponding to the corresponding one candidate to a state where the light belonging to other candidates passes through the window corresponding to the corresponding other candidates may be performed by a movement other than the rotation. For example, when a structure having a rectangular plate shape includes windows and the windows are distributed in the longitudinal direction of the structure having a rectangular plate shape, a transition may be performed by a translational movement of a translational body having a structure with a rectangular plate shape in the longitudinal direction of the structure with a rectangular plate shape by the use of a linear stepping motor. More generally, the transition may be performed by moving a movement body with a structure using a movement mechanism.

The switching mechanism 167 includes an origin detector 185. The disk-shaped structure 175 is provided with an origin detection window 178x. When the origin detection window 178x is disposed at a specific position, the rotation body 171 is disposed at an origin position.

The origin detector 185 outputs a signal indicating whether the origin detection window 178x is disposed at a specific position. Since the rotation body 171 is disposed at the origin position when the origin detection window 178x is disposed at a specific position, a signal output from the origin detector 185 indicates whether the rotation body 171 is disposed at the origin position. When the rotation body 171 is disposed at the origin position, the window 178j is disposed on the optical path of the monitoring illumination light beam 126j and the switching mechanism 167 does not interrupt the monitoring illumination light beam 126j.

8 Spectroscopic Measurement Mechanism

The spectroscopic measurement mechanism 168 includes, as illustrated in FIG. 4, an optical system 188, a linear variable filter 189, and a line sensor 190. The optical system 188 includes cylindrical lenses 191, 192, and 193.

The light which is not interrupted by the switching mechanism 167 passes through the optical system 188. While the light passes through the optical system 188, the cross-section of the light is changed from a circular shape into a linear shape. A direction in which the linear cross-section extends matches the wavelength change direction in the linear variable filter 189 and the sensor arrangement direction of the line sensor 190.

The light passing through the optical system 188 passes through the linear variable filter 189. In the linear variable filter 189, the wavelength of the passing light continuously changes in response to the position in the wavelength change direction. For this reason, when the light having a linear cross-section extending in a direction matching the wavelength change direction of the linear variable filter 189 passes through the linear variable filter 189, it is possible to obtain the light of which the wavelength continuously changes in response to the position of the linear cross-section extension direction.

The light passing through the linear variable filter 189 is received by the line sensor 190. When the light having a linear cross-section extending in a direction matching the sensor arrangement direction of the line sensor 190 and having a wavelength continuously changing in response to the position of the linear cross-section extension direction is received by the line sensor 190, an electric signal is output from a plurality of sensors and the electric signal indicates the intensity of the wavelength component corresponding to the sensor outputting the electric signal. Accordingly, an electric signal indicating the intensity of each of the plurality of wavelength components is output from the line sensor 190.

The linear variable filter 189 may be replaced by a split filter. In the split filter, the wavelength of the transmitted light changes discretely in response to the position of the wavelength change direction. The split filter includes a plurality of filters having different transmission wavelengths. The plurality of filters are arranged in the wavelength change direction of the split filter.

The spectroscopic measurement mechanism 168 may be replaced by a different kind of spectroscopic measurement mechanism. For example, the spectroscopic measurement mechanism 168 may be replaced by a spectroscopic measurement mechanism that receives light of which a wavelength is dispersed by wavelength dispersion elements such as diffraction gratings and prisms by a line sensor.

8.1 Control Unit, Storage Unit, and Operation Display Unit

The control unit 105 is an embedded computer including a CPU, a memory, and the like and is used to load firmware installed in the storage unit 107 and execute the firmware. Accordingly, the functions of the measurement control unit 111 and the calculation unit 112 are realized. The measurement control mechanism including the measurement control unit 111 realized by the embedded computer may be replaced by a different kind of measurement control mechanism. For example, a part or all of the functions realized by the embedded computer may be realized by hardware such as an electronic circuit. Similarly, a calculation mechanism including the calculation unit 112 realized by the embedded computer may be replaced by a different kind of calculation mechanism.

The operation display unit 106 includes, as illustrated in FIG. 2, an operation unit 195 and a display unit 196. An operation performed by the operation unit 195 is detected by the control unit 105 and is reflected for the measurement control or the like. The display unit 196 displays a colorimetric result or the like. The display contents of the display unit 196 are controlled by the control unit 105.

9 Operation in Case of Spectroscopic Measurement

Figure 13:
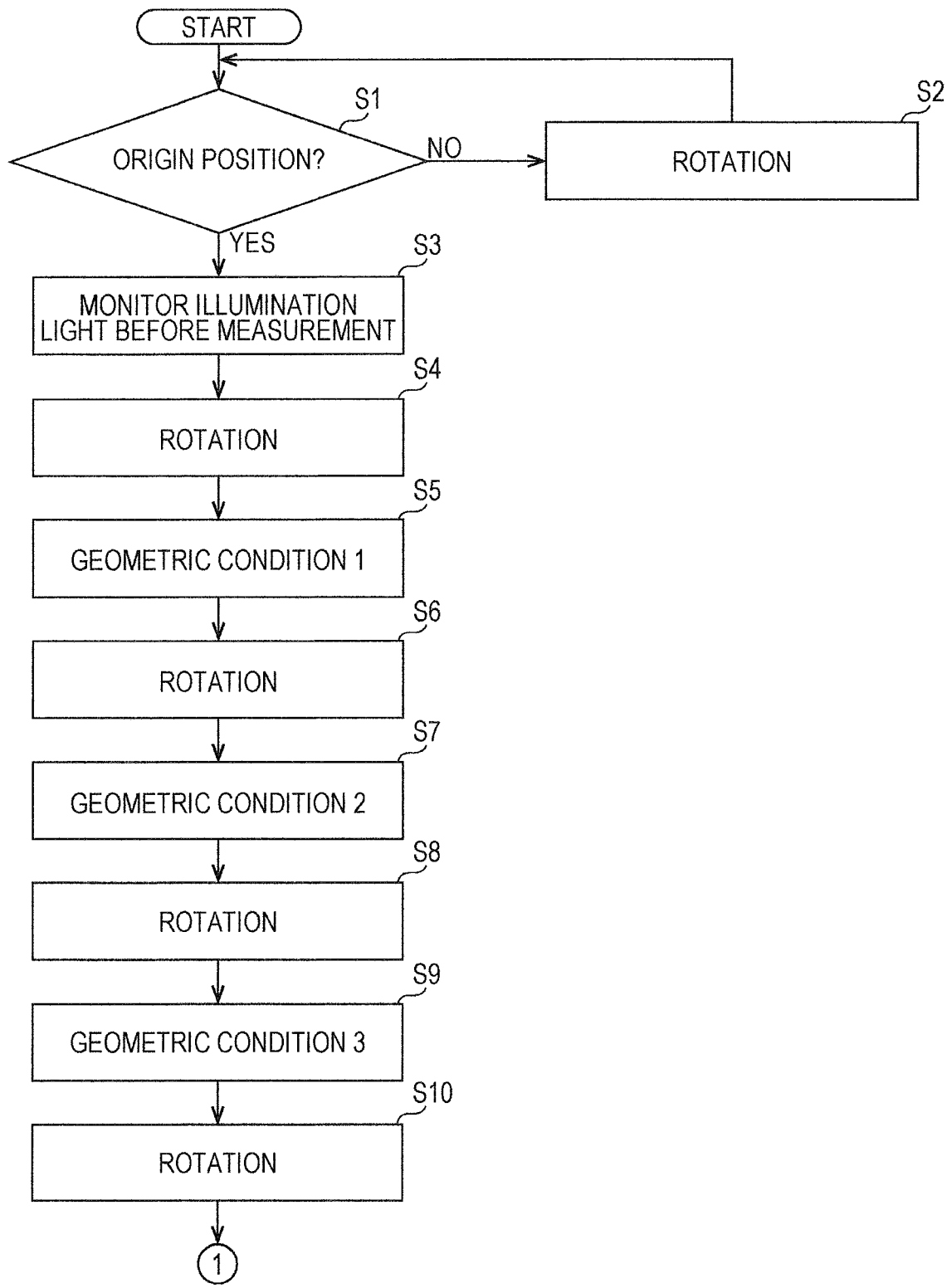
FIG. 13 is a flowchart illustrating a flow of an operation.
Figure 14:
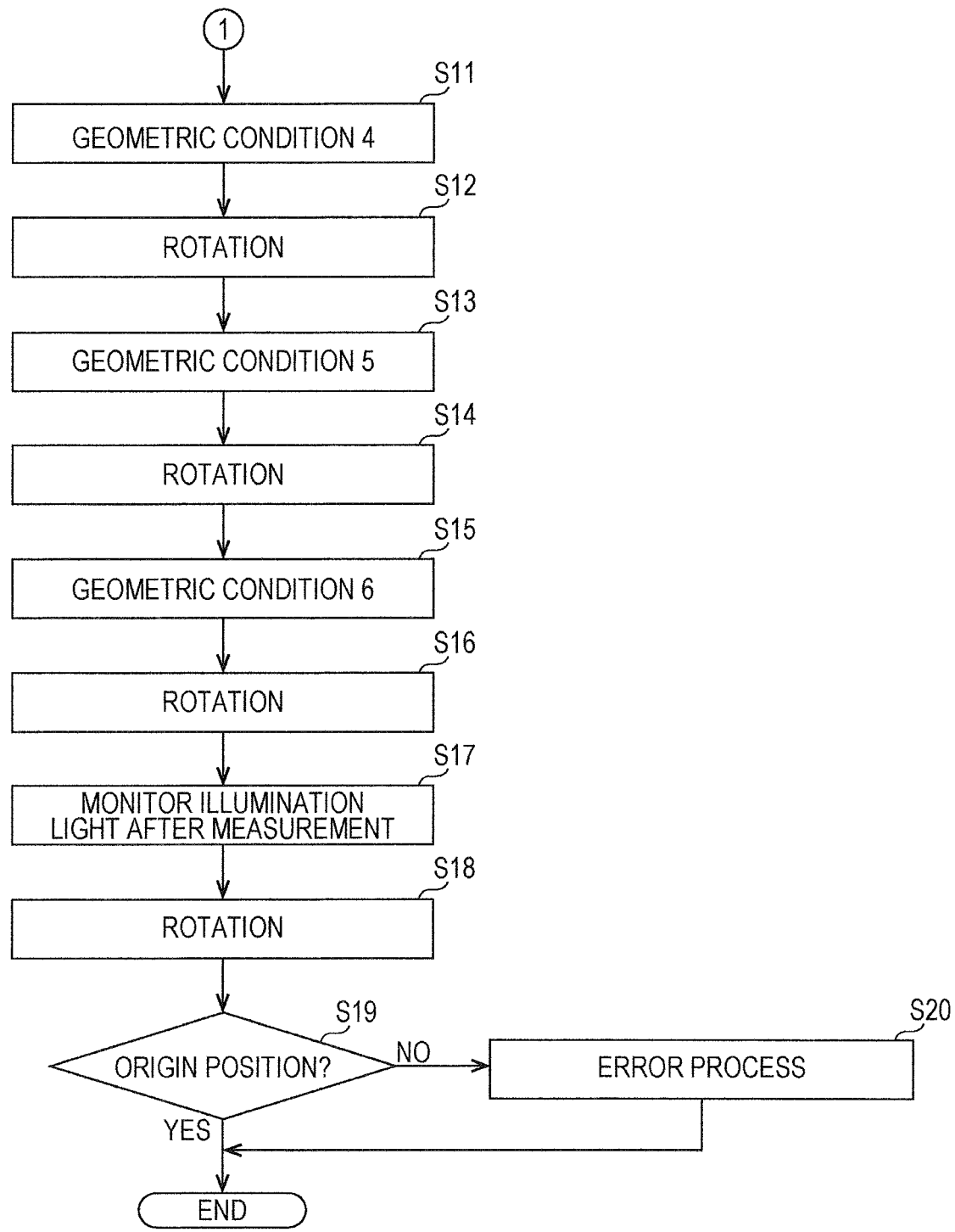
FIG. 14 is a flowchart illustrating a flow of an operation.

Flowcharts of FIGS. 13 and 14 illustrate a flow of an operation in the case of the spectroscopic measurement.

When the spectroscopic measurement is performed, as illustrated in FIGS. 13 and 14, in step S1, the measurement control unit 111 acquires a signal output from the origin detector 185 and determines whether the rotation body 171 is disposed at the origin position based on the corresponding signal.

When the measurement control unit 111 determines that the rotation body 171 is not disposed at the origin position, the measurement control unit 111 rotates the rotation body 171 by a determined angle in the circumferential direction through the stepping motor 172 in step S2 and the measurement control unit 111 determines whether the rotation body 171 is disposed at the origin position again in step S1. Accordingly, the rotation body 171 is rotated in the circumferential direction until the rotation body 171 is disposed at the origin position.

When the measurement control unit 111 determines that the rotation body 171 is disposed at the origin position, the measurement control unit 111 allows the light illuminating and receiving optical system 103 and the spectroscopic block 104 to monitor the illumination light before the measurement in step S3.

Next, in steps S5, 7, 9, 11, 13, and 15, the measurement control unit 111 allows the light illuminating and receiving optical system 103 and the spectroscopic block 104 to perform the spectroscopic measurement according to the geometric conditions 1, 2, 3, 4, 5, and 6. Before the spectroscopic measurement in steps S5, 7, 9, 11, 13, and 15, the measurement control unit 111 rotates the rotation body 171 by a determined angle in the circumferential direction through the stepping motor 172 in steps S4, 6, 8, 10, 12, and 14.

Next, the measurement control unit 111 rotates the rotation body 171 by a determined angle in the circumferential direction through the stepping motor 172 in step S16 and the measurement control unit 111 allows the light illuminating and receiving optical system 103 and the spectroscopic block 104 to monitor the illumination light after the measurement in step S17.

Next, in step S18, the measurement control unit 111 rotates the rotation body 171 by a determined angle in the circumferential direction through the stepping motor 172 so that the rotation body 171 returns to the origin position.

Next, in step S19, the measurement control unit 111 acquires a signal output from the origin detector 185 and determines whether the rotation body 171 is disposed at the origin position based on the signal.

When the measurement control unit 111 determines that the rotation body 171 is disposed at the origin position, the spectroscopic measurement ends. When the measurement control unit 111 determines that the rotation body 171 is not disposed at the origin position, the measurement control unit 111 performs an error process of providing notification of an abnormality in step S20. The measurement may be performed again instead of the error process.

10 Monitoring of Illumination Light Before Measurement

Figure 15:
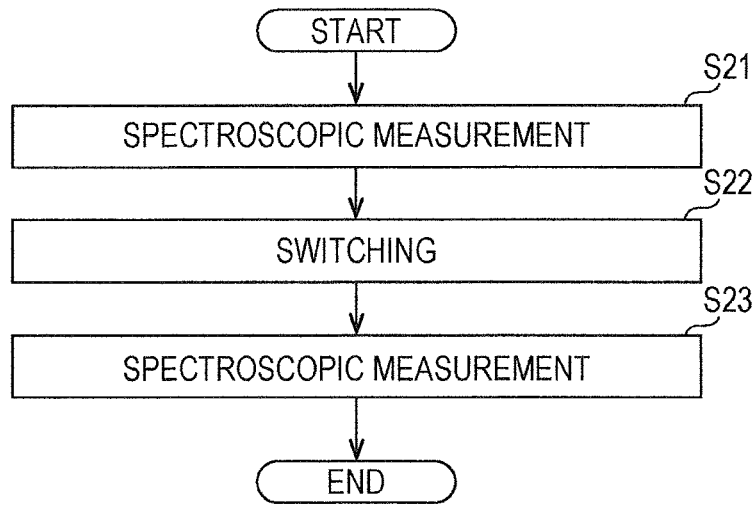
FIG. 15 is a flowchart illustrating a flow of an operation.

A flowchart of FIG. 15 illustrates a flow of an operation which is performed in the light illuminating and receiving optical system and the spectroscopic block by the measurement control unit at the time of monitoring the illumination light before the measurement.

When the illumination light before the measurement is monitored, as illustrated in FIG. 15, in step S21, the light illuminating and receiving optical system 103 radiates the illumination light beam 124$j$ and receives the monitoring illumination light beam 126$j$ and the spectroscopic measurement mechanism 168 performs the spectroscopic measurement on the monitoring illumination light beam 126$j$ and outputs the spectroscopic measurement result. When the rotation body 171 is disposed at the origin position by steps S1 and S2, the switching mechanism 167 does not interrupt the monitoring illumination light beam 126$j$. For this reason, the spectroscopic measurement for the monitoring illumination light beam 126$j$ is performed while the rotation body 171 is disposed at the origin position.

Next, in step S22, the light which is not interrupted by the switching mechanism 167 is switched so that the switching mechanism 167 does not interrupt the monitoring illumination light beam 126$k$.

Next, in step S23, the light illuminating and receiving optical system 103 radiates the illumination light beam 124$k$ and receives the monitoring illumination light beam 126$k$ and the spectroscopic measurement mechanism 168 performs the spectroscopic measurement on the monitoring illumination light beam 126$k$ and outputs the spectroscopic measurement result.

11 Spectroscopic Measurement According to Geometric Condition 1

Figure 16:
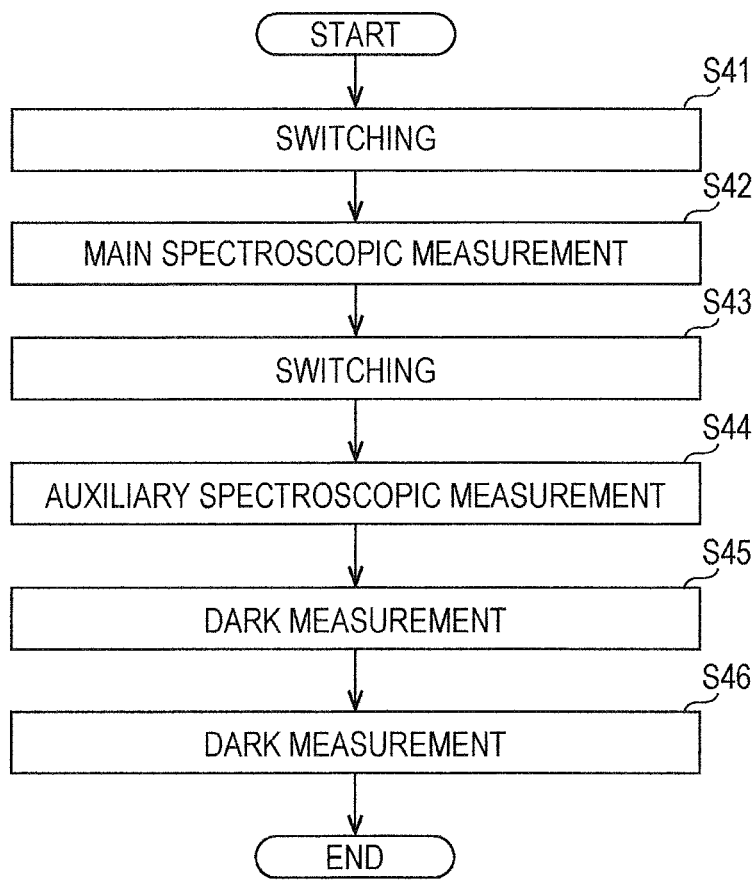
FIG. 16 is a flowchart illustrating a flow of an operation.

A flowchart of FIG. 16 illustrates a flow of an operation which is performed in the light illuminating and receiving optical system and the spectroscopic block by the measurement control unit at the time of performing the spectroscopic measurement by the geometric condition 1.

At the time of performing the spectroscopic measurement according to the geometric condition 1, as illustrated in FIG. 16, in step S41, the light which is not interrupted by the switching mechanism 167 is switched so that the switching mechanism 167 does not interrupt the reflected light beam 125$f$.

Next, in step S42, the light illuminating and receiving optical system 103 radiates the illumination light beam 124$j$ and receives the reflected light beam 125$f$ and the spectroscopic measurement mechanism 168 performs the main spectroscopic measurement on the reflected light beam 125$f$ and outputs the main spectroscopic measurement result.

Next, in step S43, the light which is not interrupted by the switching mechanism 167 is switched so that the switching mechanism 167 does not interrupt the reflected light beam 125$e$.

Next, in step S44, the light illuminating and receiving optical system 103 radiates the illumination light beam 124$k$ and receives the reflected light beam 125$e$ and the spectroscopic measurement mechanism 168 performs the auxiliary spectroscopic measurement on the reflected light beam 125$e$ and outputs the auxiliary spectroscopic measurement result.

Next, in steps S45 and S46, dark measurement is performed while the illumination light beam 124$j$ and 124$k$ are not radiated.

The light emitting diode 150$k$ which radiates the illumination light beam 124$k$ and the light emitting diode 150$j$ which radiates the illumination light beam 124$j$ are symmetrically disposed with respect to the reference axis 132 and the light incident port 163$e$ to which the reflected light beam 125$e$ is incident and the light incident port 163$f$ to which the reflected light beam 125$f$ is incident are symmetrically disposed with respect to the reference axis 132. Since the light emitting diodes 150$j$ and 150$k$ and the light incident ports 163$e$ and 163$f$ are selected in order to realize such a symmetric arrangement, the main spectroscopic measurement result and the auxiliary spectroscopic measurement result can be used for the double pass correction.

According to the flow of the operation illustrated in FIG. 16, since the main spectroscopic measurement and the auxiliary spectroscopic measurement are performed while the geometric condition 1 is kept and the main spectroscopic measurement or the auxiliary spectroscopic measurement according to the geometric condition 2, 3, 4, 5, or 6 is not performed between the main spectroscopic measurement and the auxiliary spectroscopic measurement, a time necessary from the main spectroscopic measurement according to the geometric condition 1 to the auxiliary spectroscopic measurement according to the geometric condition 1 is shortened. This contributes to an effect in which the double pass correction is completed in a short time and an influence caused by the shaking of hands on the spectroscopic measurement subjected to the double pass correction is suppressed.

Since an operation performed in the light illuminating and receiving optical system 103 and the spectroscopic block 104 by the measurement control unit 111 at the time of performing the spectroscopic measurement according to each of the geometric conditions 2, 3, 4, 5, and 6 is different only in the reflected light not interrupted by the switching mechanism 167, that is, the reflected light corresponding to the spectroscopic measurement target, a description thereof will be omitted.

12 Monitoring of Illumination Light after Measurement

Figure 17:
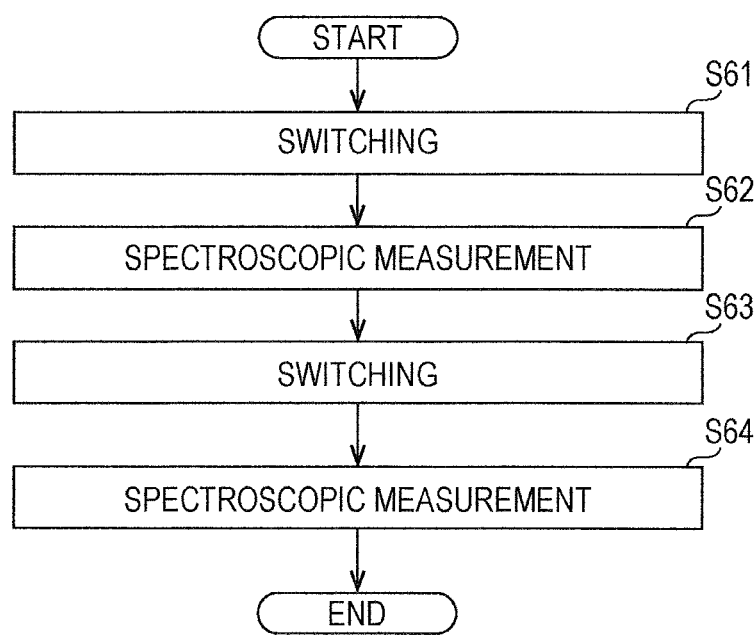
FIG. 17 is a flowchart illustrating a flow of an operation.

A flowchart of FIG. 17 illustrates a flow of an operation performed in the light illuminating and receiving optical system and the spectroscopic block by the measurement control unit at the time of monitoring the illumination light after the measurement.

At the time of monitoring the illumination light after the measurement, as illustrated in FIG. 17, in step S61, the light interrupted by the switching mechanism 167 is switched so that the switching mechanism 167 does not interrupt the monitoring illumination light beam 126*j*.

Next, in step S62, the light illuminating and receiving optical system 103 radiates the illumination light beam 124*j* and receives the monitoring illumination light beam 126*j* and the spectroscopic measurement mechanism 168 performs the spectroscopic measurement on the monitoring illumination light beam 126*j* and outputs the spectroscopic measurement result.

Next, in step S63, the light interrupted by the switching mechanism 167 is switched so that the switching mechanism 167 does not interrupt the monitoring illumination light beam 126*k*.

Next, in step S64, the light illuminating and receiving optical system 103 radiates the illumination light beam 124*k* and receives the monitoring illumination light beam 126*k* and the spectroscopic measurement mechanism 168 performs the spectroscopic measurement on the monitoring illumination light beam 126*k* and outputs the spectroscopic measurement result.

13 Calculation

The calculation unit 112 calculates the spectroscopic measurement result subjected to the double pass correction based on the average of the main spectroscopic measurement result and the auxiliary spectroscopic measurement result. Further, the calculation unit 112 calculates the colorimetric value from the spectroscopic measurement result subjected to the double pass correction. The colorimetric values are expressed by a Munsell color system, a L*a*b* color system, a L*C*h color system, a Hunter Lab color system, an XYZ color system, and the like. The spectroscopic measurement result may be corrected by the dark measurement result, the spectroscopic measurement result for the monitoring illumination light, or the like.

14 Arrangement of Light Emitting Ports

The light emitting ports 164*a*, 164*b*, 164*c*, 164*d*, 164*e*, 164*f*, 164*g*, 164*h*, and 164*i* are disposed so that a distance from the light emitting port emitting the reflected light having a relatively large light receiving angle to an optical axis 198 of the spectroscopic measurement mechanism 168 becomes relatively long and a distance from the light emitting port emitting the reflected light having a relatively small light receiving angle to the optical axis 198 of the spectroscopic measurement mechanism 168 becomes relatively short. For example, the light emitting ports 164*c* and 164*d* respectively emitting the reflected light beams 125*c* and 125*d* having a light receiving angle of 30° are closer to the optical axis 198 of the spectroscopic measurement mechanism 168 in relation to the light emitting ports 164*a* and 164*b* respectively emitting the reflected light beams 125*a* and 125*b* having a light receiving angle of 20°.

The light amount of the reflected light received by the light illuminating and receiving optical system 103 decreases as the light receiving angle of the reflected light increases and the light amount of the reflected light received by the line sensor 190 decreases as the inclination of the optical path of the reflected light from the optical axis 198 increases. For this reason, when the light emitting ports 164*a*, 164*b*, 164*c*, 164*d*, 164*e*, 164*f*, 164*g*, 164*h*, and 164*i* are arranged to satisfy a relation for a distance to the optical axis, a change in sensitivity due to the light receiving angle of the reflected light is suppressed. Desirably, although the light emitting ports 164*a*, 164*b*, 164*c*, 164*d*, 164*e*, 164*f*, 164*g*, 164*h*, and 164*i* are arranged so as to satisfy a relation for a distance to the optical axis in all of the light emitting ports 164*a*, 164*b*, 164*c*, 164*d*, 164*e*, 164*f*, 164*g*, 164*h*, and 164*i*, it is possible to obtain an effect of suppressing a change in sensitivity due to the light receiving angle of the reflected light even when the light emitting ports 164*a*, 164*b*, 164*c*, 164*d*, 164*e*, 164*f*, 164*g*, 164*h*, and 164*i* are arranged to satisfy a relation for a distance to the optical axis only in a part of the light emitting ports 164*a*, 164*b*, 164*c*, 164*d*, 164*e*, 164*f*, 164*g*, 164*h*, and 164*i*.

The light emitting ports 164*a*, 164*b*, 164*c*, 164*d*, 164*e*, 164*f*, 164*g*, 164*h*, 164*i*, 164*j*, and 164*k* are arranged in two rows and the light emitting ports 164*a*, 164*b*, 164*c*, 164*d*, 164*e*, 164*f*, 164*g*, 164*h*, and 164*i* emitting the reflected light among them are also arranged in two rows. Accordingly, the light emitting ports 164*a*, 164*b*, 164*c*, 164*d*, 164*e*, 164*f*, 164*g*, 164*h*, 164*i*, 164*j*, and 164*k* do not spread in a long distance and a change in sensitivity due to the light emitting port is suppressed. The light emitting ports 164*a*, 164*c*, 164*e*, 164*g*, 164*i*, and 164*j* are arranged in the first row and are arranged in the arrangement direction indicated by an arrow 196. The light emitting ports 164*b*, 164*d*, 164*f*, 164*h*, and 164*k* are arranged in the second row and are arranged in the arrangement direction indicated by the arrow 196. The light emitting ports 164*a*, 164*b*, 164*c*, 164*d*, 164*e*, 164*f*, 164*g*, 164*h*, 164*i*, 164*j*, and 164*k* may be arranged in three or more rows and the light emitting ports 164*a*, 164*b*, 164*c*, 164*d*, 164*e*, 164*f*, 164*g*, 164*h*, and 164*i* emitting the reflected light may be arranged in three or more rows.

The light emitting ports 164*a*, 164*c*, 164*e*, 164*g*, and 164*i* disposed at the first row respectively emit the reflected light beams 125*a*, 125*c*, 125*e*, 125*g*, and 125*i* corresponding to the main spectroscopic measurement targets. The light emitting port 164*j* disposed at the first row emits the monitoring illumination light beam 126*j* used for the main spectroscopic measurement. The light emitting ports 164*b*, 164*d*, 164*f*, and 164*h* disposed in the second row respectively emit the reflected light beams 125*b*, 125*d*, 125*f*, and 125*h* corresponding to the auxiliary spectroscopic measurement targets. The light emitting port 164*k* disposed at the second row emits the monitoring illumination light beam 126*k* used for the auxiliary spectroscopic measurement.

In the first row, the light emitting ports 164*a*, 164*c*, 164*e*, 164*g*, 164*i*, and 164*j* are linearly arranged and the arrangement pitch is p. In the second row, the light emitting ports 164*b*, 164*d*, 164*f*, 164*h*, and 164*k* are linearly arranged and the arrangement pitch is p.

Although the invention has been illustrated and described in detail, the description above is illustrative and not restrictive in all aspects. Therefore, it should be understood that a number of modifications and variations can be devised without departing from the scope of the invention.

REFERENCE SIGNS LIST 100 multi-angle colorimeter
103 light illuminating and receiving optical system
104 spectroscopic block
111 measurement control unit
112 calculation unit
121 measurement target position
132 reference axis 167 switching mechanism
168 spectroscopic measurement mechanism
171 rotation body
172 stepping motor
175 disk-shaped structure

The invention claimed is:

1. A multi-angle colorimeter comprising:
a first illuminator configured to illuminate light toward a measurement target position at a certain angle;
a second illuminator configured to illuminate light symmetrically to illumination by the first illuminator with respect to a reference axis passing through the measurement target position;
a first light receiver that is disposed facing the measurement target position and is configured to receive light that is illuminated by the first illuminator and reflected at the measurement target position at the certain angle;
a second light receiver that is disposed facing the measurement target position and is configured to receive light that is illuminated by the first illuminator and reflected at the measurement target position at an angle different from a light receiving angle of the first light receiver;
a third light receiver that is disposed facing the measurement target position and is configured to receive light that is illuminated by the second illuminator and reflected at the measurement target position at an angle symmetric to a light receiving angle of the first light receiver with respect to a reference axis passing through the measurement target position;
a fourth light receiver that is disposed facing the measurement target position and receives light that is illuminated by the second illuminator and reflected at the measurement target position at an angle symmetrical to a light receiving angle of the second light receiver with respect to a reference axis passing through the measurement target position;
one light receiving sensor configured to output a signal in accordance with light received by each light receiver;
a plurality of light guiding members configured to guide the light received by each light receiver to the one light receiving sensor;
a switch configured to switch the light from the plurality of light guiding members to the light receiving sensor subsequently in an order of light reception by the first light receiver, the light reception by the third light receiver, the light reception by the second light receiver, and the light reception by the fourth light receiver; and
a calculator configured to calculate a measurement result based on a signal in accordance with light received by the first light receiver and a signal in accordance with light received by the third light receiver, and to calculate a measurement result based on a signal in accordance with light received by the second light receiver and a signal in accordance with light received by the fourth light receiver.

2. The multi-angle colorimeter according to claim 1, wherein
the calculator is further configured to calculate a measurement result based on an average of a signal in accordance with the light received by the first light receiver and a signal in accordance with the light received by the third light receiver, and to calculate a measurement result based on an average of a signal in accordance with the light received by the second light receiver and a signal in accordance with the light received by the fourth light receiver.

3. The multi-angle colorimeter according to claim 2 wherein each of the light guiding members has:
at least one optical fiber;
a light incident port connected to a respective one of the light receivers; and
a light emitting port connected to the one light receiving sensor.

4. The multi-angle colorimeter according to claim 3, wherein
the switch further comprises a light shielder configured to selectively allow passage of light toward the light receiving sensor from one light incident port of the plurality of light incident ports, and to shield residual light toward the light receiving sensor from residual light incident ports other than the one light incident port among the light incident ports.

* * * * *